(12) United States Patent
Oohira et al.

(10) Patent No.: US 7,237,960 B2
(45) Date of Patent: Jul. 3, 2007

(54) MAGNETIC ENCODER AND WHEEL SUPPORT BEARING ASSEMBLY UTILIZING THE SAME

(75) Inventors: Kouya Oohira, Iwata (JP); Tatsuo Nakajima, Iwata (JP); Arito Matsui, Iwata (JP); Kazutoyo Murakami, Iwata (JP)

(73) Assignee: NTN Corporation, Osaka (JP)

( * ) Notice: Subject to any disclaimer, the term of this patent is extended or adjusted under 35 U.S.C. 154(b) by 191 days.

(21) Appl. No.: 10/940,776

(22) Filed: Sep. 15, 2004

(65) Prior Publication Data
US 2005/0058376 A1 Mar. 17, 2005

(30) Foreign Application Priority Data

Sep. 16, 2003 (JP) ............................. 2003-322507
Sep. 29, 2003 (JP) ............................. 2003-336677

(51) Int. Cl.
*F16C 41/00* (2006.01)
*B23P 25/00* (2006.01)
*G01P 3/487* (2006.01)

(52) U.S. Cl. .................. 384/448; 29/445; 29/527.2; 324/207.25

(58) Field of Classification Search ............. 384/448, 384/477, 544; 29/446, 447, 450–453, 458, 29/527.2; 324/207.25, 173, 174
See application file for complete search history.

(56) References Cited

U.S. PATENT DOCUMENTS 5,522,268 A 6/1996 Wenzel

FOREIGN PATENT DOCUMENTS

| EP | 0 249 973 A1 | 12/1987 |
|----|--------------|---------|
| EP | 0 995 538 A1 | 4/2000 |
| EP | 1 296 144 A2 | 3/2003 |
| EP | 1 296 144 A3 | 3/2003 |
| JP | 2005-43294 | 2/2005 |

OTHER PUBLICATIONS

Mizuta Hideo, Patent Abstracts of Japan, "Bearing Seal Having Rotation Detecting Device", Publication No. 05-238369, Publication Date: Sep. 17, 1993 and Patent No. 2816783.

(Continued)

*Primary Examiner*—Thomas R. Hannon

(57) ABSTRACT

To substantially eliminate deficiencies such as portions of the resinous coating, where the film thickness is reduced considerably during the press-fitting, and to aim at providing a high productivity with a reduced cost and without the possibility of occurrence of rusting after a prolonged time of use under severe environmental conditions due to an excellent anticorrosive property, a magnetic encoder (10) includes a multipolar magnet (14) having a plurality of alternating magnetic poles alternating with each other in a direction circumferentially thereof, and a core metal (11) supporting the multipolar magnet (14). The multipolar magnet (14) is formed of a sintered element prepared by mixing and sintering a powdery mixture of a magnetic powder and a non-magnetic metallic powder. The multipolar magnet (14) is fixed on the core metal (1) by staking a portion of the core metal (11), and a sintered element/core metal assembly (21) fixed on the core metal (11) is surface treated to have with an anticorrosive resinous coating (22) for anticorrosive purpose. When the magnetic encoder is press-fitted on an encoder carrier member, one of a press-fitting punch and the magnetic encoder (10) is heated to a temperature within the range of 60 to 150° C.

1 Claim, 14 Drawing Sheets

OTHER PUBLICATIONS

Hajzler Christian, Patent Abstracts of Japan, "Sealing Structure Incorporating Encoder", Publication No. 06-281018, Publication Date: Oct. 7, 1994.

Nakajima Tatsuo, Patent Abstracts of Japan, "Magnetic Encoder and Bearing For Wheel Employing the Same", Publication No. 2003-035565, Publication Date: Feb. 7, 2003.

Nakajima Tatsuo, Patent Abstracts of Japan, "Magnetic Encoder and Wheel Bearing Using It", Publication No. 2004-037441, Publication Date: Feb. 5, 2004.

Nakajima Tatsuo et al., Patent Abstracts of Japan, "Magnetic Encoder and Bearing For Wheel Equipped With the Same", Publication No. 2004-085534, Publication Date: Mar. 18, 2004.

Partial European Search Report.

Masato Mitsusato, Patent Abstracts of Japan, "Production of Sintered Rate Earth Base Permanent Magnet", Publication No. 06340902 and Publication Date: Dec. 13, 1994.

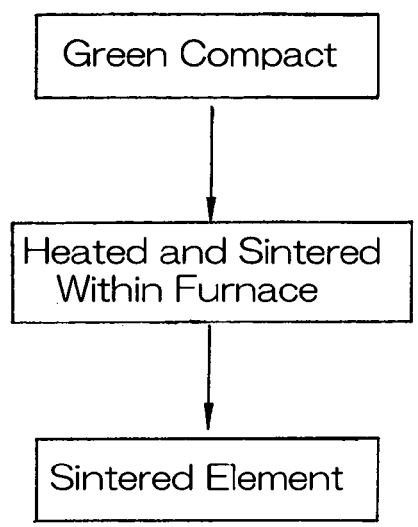
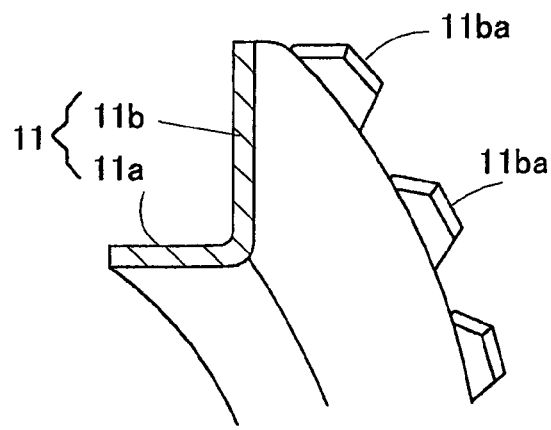
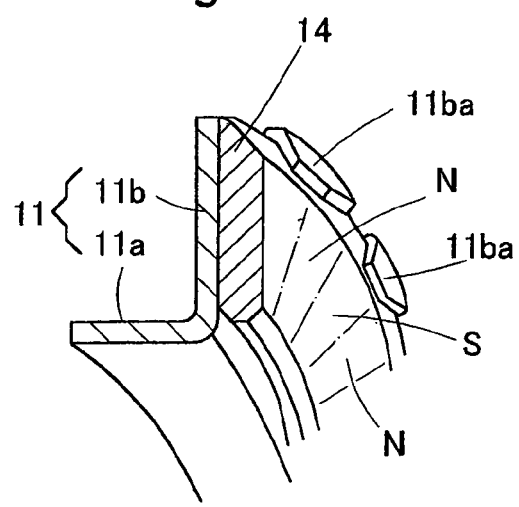

MAGNETIC ENCODER AND WHEEL SUPPORT BEARING ASSEMBLY UTILIZING THE SAME

BACKGROUND OF THE INVENTION

1. Field of the Invention

The present invention relates to a magnetic encoder for use in a rotation detecting device for detecting the number of revolutions of one of bearing components rotatable relative to each other and also to a wheel support bearing assembly utilizing such magnetic encoder. The magnetic encoder to which the present invention pertains is suitably incorporated in a bearing seal assembly mounted on the rotation detecting device of a kind utilized in association with an automobile anti-skid brake system for detecting the number of revolutions of at least one of front and rear wheels of an automotive vehicle.

2. Description of the Related Art

A rotation detecting device for use in association with an automobile anti-skid brake system for minimizing the hazard of an automotive vehicle being skidded on a road surface has hitherto been assembled in a number of structures. In general, the conventional rotation detecting device includes a serrated rotor and a detecting sensor, which are arranged spaced a distance from each other by means of a sealing device used to seal the bearing assembly, but are functionally integrated together to define a single and independent rotation detecting device. This conventional rotation detecting device is of a structure capable of sensing the number of revolutions of the serrated rotor, mounted on a rotary shaft, by utilizing a rotation detecting sensor secured to a vehicle knuckle, and the wheel support bearing assembly used in association with such rotation detecting device is protected by the sealing device, disposed independently and laterally of the bearing assembly, from an undesirable ingress of foreign matters such as dusts and dirt and/or water.

The Japanese Patent No. 2816783 discloses a bearing seal assembly designed to minimize the space for installation of a rotation detecting device and also to dramatically increase the detecting performance. This prior art bearing seal assembly incorporates therein a rotation detecting device for detecting the number of revolutions of a wheel and includes an annular slinger and an elastic member admixed with a powdery magnetic material and bonded by vulcanization to the annular slinger, with a plurality of opposite magnetic poles defined so as to alternate circumferentially of the elastic member.

The Japanese Laid-open Patent Publication No. 6-281018 discloses a built-in coder sealing structure so designed as to reduce the axial dimension of the sealing structure to thereby enhance the sealability between a rotating element and a stationary element and to render it to be easily mounted. According to this patent publication, a gap between the rotating element and the stationary element is sealed, with a rotary disc mounted on the rotating element for rotation together therewith. A multi-pole coder is mounted on the rotary disc and built in the sealing structure. The multi-pole coder used therein is made of an elastomer added with a powdery magnetic material to form a sealing means, with its side face held substantially flush with the stationary element.

The coder made of the plastic material (plastomer) containing a powdery magnetic material or magnetic particles is shaped by the use of a mold assembly having a mold cavity, which is a replica of the shape of a final product, in a manner similar to that accomplished by means of any existing injection molding technique or a compressive molding technique. In other words, the shape of the final product, that is, the coder may be defined by molding it to a shape complemental to the shape of the molding cavity in the mold assembly, or by punching a molded sheet, prepared by the use of a T-die extrusion molding technique or a calendar molding technique, followed by bonding it on a metallic substrate by the use of a bonding agent. In such case, with a metallic substrate incorporated within the molding cavity beforehand, a melt resin may be poured into the molding cavity to allow the article to be simultaneously molded and bonded to the metallic substrate, such as generally practiced in the insert molding process.

The Japanese Laid-open Patent Publication No. 2003-35565 discloses a magnetic member formed by mixing a synthetic resinous paint with a powdery magnetic material.

Any of the foregoing magnetic encoder includes a multipolar magnet containing the powdery magnetic material. Where the prior art magnetic encoder is used in the bearing assembly for an automotive vehicle, and since the automotive bearing assembly is quite often exposed to such a severe environment as containing saline muddy water found on the road surface, a rusting tends to occur in the magnetic encoder when it is used for a prolonged period of time. In particular, where the content of the powdery magnetic material is increased for compactization purpose, the rusting tends to occur easily. In view of this, the Applicant has thought of the possibility of applying an antirust coating to the multipolar magnet of the magnetic encoder, but it has been found difficult to select a suitable antirusting material.

Since the multipolar magnet prepared from the elastomer or plastomer containing the powdery magnetic material has problems, the Applicant of the present invention has suggested, in its Japanese Laid-open. Patent Publication No. 2004-037441, the use of a sintered element formed as the multipolar magnet by sintering a mixture of the magnetic powder and the non-magnetic metallic powder. Even this multipolar magnet requires an antirusting treatment that suits to the characteristics thereof.

Also, in its Japanese Laid-open Patent Publication No. 2004-085534, the Applicant of the present invention has suggested the multipolar magnet formed with an antirusting coating prepared from a clear type high anticorrosive paint. However, the painting of the multipolar magnet with the modified epoxy clear paint by means of a dipping technique or a spraying technique requires the film thickness to be increased to satisfy the requirement of an anticorrosive property for automotive component parts that are exposed to the road surface, resulting in increase of the cost. In addition, this painting requires the use of a mask, resulting in a complicated and time-consuming process step. Furthermore, in order to secure a uniform film thickness and a satisfactory flatness of the coating formed, the latitude of control of the process, for example, of painting and baking during the formation of the coating becomes limited, with the yield of production consequently lowered.

Yet, in a condition in which the multipolar magnet, which is the sintered element, is fixed on a core metal by staking, in order to increase the anticorrosive property between the core metal and the sintered element, dipping of the multipolar magnet and the core metal into a bath containing the modified epoxy clear paint, painting of the sintered element itself or a hole fill-up treatment of the sintered element is often practiced, but it requires a high cost and is not therefore economical.

In view of the foregoing, the Applicant of the present invention has suggested, in its Japanese Patent Application No. 2003-279563, a multipolar magnet made of a sintered element prepared by sintering a powdery mixture of the magnetic powder and the non-magnetic metallic powder, which magnet is fixed on the core metal by staking to form a sintered element/core metal assembly which is subsequently surface treated to have an anticorrosive coating. The surface treatment is in the form of, for example, a cation electrodeposition to form the resinous coating. However, in the case of a magnetic encoder having the above sintered element/core metal assembly applied with the anticorrosive resinous coating, scratches tend to occur during the anticorrosive coating process and/or pinholes tend to be formed in the anticorrosive coating during the baking, with the film thickness reduced at localized portions, accompanied by reduction in the anticorrosive property at those portions.

The foregoing inconveniences occur similarly in the magnetic encoder in which an anticorrosive coating of a clear type is formed on a surface of the multipolar magnet. Specifically, the resinous coating formed by means of a coating technique, a dipping technique, an electrodeposition technique or any other technique can generally have a film thickness not smaller than 15 µm, but in the event of occurrence of the scratches during the painting process and/or the pinholes during the baking process, there is a high possibility that the film thickness at such portions where the scratches and/or pinholes are formed will decrease to a value smaller than 5 µm, accompanied in reduction of the anticorrosive property. The reduction of the anticorrosive property is not welcome since it results in lowering of the magnetic force the multipolar magnet can emanate.

Also, the magnetic encoder, while in the form of the sintered element/core metal assembly, is press-fitted on an outer peripheral surface of a bearing inner race or the like by pushing the multipolar magnet onto the bearing inner race by means of a punch brought into contact with the annular surface of the multipolar magnet. In other words, the magnetic encoder having the antirusting coating formed thereon is press-fitted while being applied a pressure from the punch. It has, however, been found that the inconveniences of the pinholes and/or scratches remain unremoved and the presence of the pinholes and/or scratches in the resinous coating eventually leads to reduction in anticorrosive property, which in turn brings about reduction of the magnetic force the multipolar magnet can generate.

SUMMARY OF THE INVENTION

In view of the foregoing, an object of the present invention is to provide an improved magnetic encoder, in which deficiencies such as portions of the resinous coating, where the film thickness is reduced considerably during the press-fitting, can be substantially eliminated and, therefore, there is no risk of rusting even after a prolonged time of use under severe environmental conditions due to an excellent anticorrosive property, and which is excellent in productivity enough to lower the cost.

Another object of the present invention is to provide an improved method of mounting the magnetic encoder, which can be efficiently and effectively mounted on an encoder carrier member.

A further object of the present invention is to provide an improved magnetic encoder, which utilizes a multipolar magnet made of the sintered element and has an increased toughness and is easy to handle.

A still further important object of the present invention is to provide a wheel support bearing assembly utilizing the magnetic encoder of the type referred to above for detecting a rotational speed, which encoder is excellent in anticorrosiveness and productivity and which is compact in structure with no need to increase the number of component parts used and is therefore less costly.

In order to accomplish these objects of the present invention, the present invention in accordance with a first aspect thereof provides a magnetic encoder, which includes a multipolar magnet formed of a sintered element and having a plurality of magnetic poles alternating with each other in a direction circumferentially thereof; and a core metal supporting the multipolar magnet. The sintered element is prepared by sintering a powdery mixture of a magnetic powder and a non-magnetic metallic powder and is fixed on the core metal by means of a staking technique to provide a sintered element/core metal assembly, and an anticorrosive resinous coating formed over an entire surface of the sintered element/core metal assembly by means of a surface treatment. When the magnetic encoder is press-fitted on an outer periphery of an encoder carrier member, at least one of a press-fitting punch and the magnetic encoder is heated to a temperature within the range of 60 to 150° C. The core metal may be annular in shape and the multipolar magnet is correspondingly annular in shape.

According to the first aspect of the present invention, the effect brought about by the anticorrosive surface treatment applied to the sintered element/core metal assembly by the resinous coating and the effect brought about by the press-fitting process carried out under a heated condition can be obtained in the following manners. Specifically, since the multipolar magnet, which is the sintered element/core metal assembly and which is fixedly mounted on the core metal by staking, is surface treated to have the anticorrosive resinous coating, the anticorrosive property of the magnetic encoder can be increased and, as compared with the surface treatment carried out individually for the multipolar magnet and the core metal, the number of process step can be reduced to achieve a high productivity, accompanied by reduction in cost.

Also, since, when the magnetic encoder is press-fitted on the outer periphery of the encoder carrier member, at least one of the press-fitting punch and the magnetic encoder is heated to a temperature within the range of 60 to 150° C., the magnetic encoder can be press-fitted while the resinous coating is in a softened condition. For this reason, even though pinholes and/or scratches are present in the surface of the resinous coating, the softened resin can flow towards portion of the resinous coating where the film thickness is extremely small due to the presence of the pinholes and/or scratches, to thereby fill up those portions. If those portions of the resinous coating where the film thickness is extremely small due to the presence of the pinholes and/or scratches can be minimized, the anticorrosive property of the magnetic encoder can be increased considerably. Mere heating during the press-fitting is sufficient and, therefore, the number of process steps will not increase unduly.

In view of those advantages, the magnetic encoder can be substantially free from rusting even when used for a prolonged period of time under severe environmental conditions and can be manufactured with high productivity and at a reduced cost.

With respect to the heating temperature, if it is not higher than 60° C., no sufficient mobility of the resin when softened during the press-fitting can be obtained, but when it exceeds 150° C., a satisfactory softening of the resinous coating can be obtained, but a rubber seal used with the magnetic encoder or a grease used to secure the sealing capability is apt to be deteriorated. Therefore, the temperature range from 60 to 150° C. is preferred in the practice of the present invention.

In the practice of the first aspect of the present invention, the surface treatment may be carried out by any process including an electrodeposition process, a coating process and a dipping process. However, the use of the electrodeposition process is particularly preferred since it can exhibit a good adherence as compared with that based on the coating process and, therefore, the sintered element/core metal assembly can advantageously be coated over the entire surface thereof and, hence, the multipolar magnet prepared from the sintered element can be coated over the entire surface thereof, with the anticorrosive property of the multipolar magnet itself increased consequently. Also, with the electrodeposition process, the coating material can easily penetrate into a gap between the sintered element and the core metal and, therefore, a bonding effect can be obtained, wherefore the multipolar magnet and the core metal can be firmly connected together by the staking effect and the bonding effect. By way of example, even though the staking is rather loose, the bonding effect is effective to prevent the multipolar magnet from being separated from the core metal, with the reliability as a product consequently increased.

In addition, as compared with the coating process and the dipping process, the electrodeposition process is capable of providing a uniform film thickness of the resinous coating and, therefore, the control of dimension of the magnetic encoder can easily be achieved.

For the electrodeposition practiced in the present invention, an anion electrodeposition, in which the sintered element/core metal assembly is held in a plus polarity, and a cation electrodeposition, in which the sintered element/core metal assembly is held in a minus polarity, are available. Where the anticorrosive property is highly required such as found in automobile component parts, the use of the cation electrodeposition is preferred.

In the first aspect of the present invention, the magnetic powder may be either a magnetic powder of samarium compound (hereinafter referred to as a samarium powder) or a magnetic powder of neodymium compound (hereinafter referred to as a neodymium powder). If the samarium powder or the neodymium powder is used, a strong magnetic force can be obtained. For the samarium powder, a magnetic powder of samarium iron nitrogen type (SmFeN) can be suitably employed, and for the neodymium powder, a magnetic powder of neodymium iron boron type (NdFeB) can be suitably employed. Other than those specific powders, the magnetic powder may be a gas atomized powder of manganese aluminum (MnAl) particles.

The non-magnetic metallic powder may be prepared from tin particles. Where the magnetic powder is a powder of ferrite or a compound of samarium or a compound of neodymium, a powder of tin particles may be used for the non-magnetic metallic powder.

The powdery mixture may include two or more magnetic powders or two or more non-magnetic metallic powders. Also, the powdery mixture may include two or more magnetic powders in admixture with two or more non-magnetic metallic powders. Where two or more magnetic powders or two or more non-magnetic metallic powders are contained, a desired characteristic can be obtained by mixing a desired number of the different powders. By way of example, where no sufficient magnetic force is obtained with the use of the ferrite powder, a samarium powder or a neodymium powder, which is a powder of rare earth magnetic material, may be mixed in a required amount with the ferrite powder so that while magnetic force is increased, the multipolar magnet can be manufactured inexpensively.

According to the first aspect of the present invention, there is also provided a wheel support bearing assembly equipped with the magnetic encoder of the structure as defined above. As is well known to those skilled in the art, the wheel support bearing assembly is generally exposed to the road surface and it is quite often that the magnetic encoder may be wetted with a saline muddy water. However, since the sintered element/core metal assembly forming the magnetic encoder is surface treated to have an anticorrosive coating over the entire surface thereof and since, when the magnetic encoder is press-fitted onto an outer periphery of a rotating element of the bearing assembly, the press-fitting punch or the magnetic encoder is heated to a temperature within the range of 60 to 150° C., the deficiencies appearing in the resinous coating can be substantially eliminated during the press-fitting as a result of the resinous coating having been softened and, therefore, the effect of preventing the magnetic encoder from being rusted in contact with the saline muddy water is advantageously high.

Also, although it may often occur that particles such as sand particles may be trapped in between the magnetic encoder and a magnetic sensor disposed in face-to-face relation with the magnetic encoder, the following protection is available against the particle trapping. As compared with the conventional coder made of an elastic material or elastomer containing the magnetic powder or magnetic particles, the multipolar magnet prepared from the sintered element of a composition containing the magnetic powder and the non-magnetic metallic powder has a very high surface hardness. Because of this, in the wheel support bearing assembly equipped with the magnetic encoder for the detection of the rotational speed of the vehicle wheel, even when the particles such as sand particles are trapped in a gap between the multipolar magnet on a rotating side and the magnetic sensor on a stationary side during run of the automotive vehicle, an effect of reducing the frictional wear and/or damage of the multipolar magnet can be obtained.

In the wheel support bearing assembly according to the first aspect of the present invention, a component part of a sealing unit for sealing an annular bearing space may be employed in the form of the magnetic encoder. By way of example, the wheel support bearing assembly is for rotatably supporting a vehicle wheel relative to a vehicle body structure and may include an outer member having an inner peripheral surface formed with a plurality of outer raceway grooves, an inner member having an outer peripheral surface formed with a corresponding number of inner raceway grooves in alignment with the outer raceway grooves and positioned inside the outer member with an annular bearing space defined between it and the outer member, a row of rolling elements received in part within each of the outer raceway grooves and in part within the mating inner raceway groove, and a sealing unit for sealing one of opposite open ends of the annular bearing space between the outer and inner members, respectively. The magnetic encoder forms a component part of this sealing unit. In such case, the sealing unit may include a first seal plate of a generally L-sectioned annular shape mounted on one of the outer and inner members, which is a rotating side, and including an axial cylindrical wall and a radial wall extending radially from the axial cylindrical wall, a second seal plate of a generally L-sectioned annular shape mounted on the other of the outer and inner members, which is a stationary side, in face-to-face relation with the first seal plate and including an axial cylindrical wall and a radial wall extending radially from the axial cylindrical wall, and an elastic sealing member fixedly mounted on the second seal plate and including at least one side sealing lip slidingly engageable with the radial wall of the first seal plate and a radial sealing lip slidingly engageable with the cylindrical wall of the first seal plate. The first seal plate serves as the core metal of the magnetic encoder and the multipolar magnet is mounted on the radial wall of the first seal plate in partly overlapped relation therewith.

In this wheel support bearing assembly, one of component parts of the sealing unit is employed in the form of the magnetic encoder and, therefore, with no need to increase the number of component parts, the rotation of the vehicle wheel can be detected in a compact structure. Also, where the magnetic encoder is constituted in this sealing unit, a problem would arise in that sand particles or the like may be trapped in between the magnetic encoder and the magnetic sensor since the magnetic encoder is exposed to the road surface. However, since the multipolar magnet has a high surface hardness as described above, the effect of reducing the frictional wear and/or damage can be obtained. The anticorrosive effect resulting from the surface treatment for anticorrosive purpose is also obtained. Also, in the case of this structure, since the side sealing lip and the radial sealing lip both secured to the second seal plate are held in sliding contact with the first seal plate, an excellent sealing effect can be obtained as well.

The first seal plate may be of a generally inverted Z-sectioned annular shape including a first axial cylindrical wall mounted on the rotating element, a radial wall extending radially from the first axial cylindrical wall and a second outer cylindrical wall (cylindrical flange) axially extending axially from the radial wall in a direction counter to the first axial cylindrical wall. If the first seal plate is of a generally inverted Z-sectioned annular shape, the second axial cylindrical wall can be used for staking of the sintered element. Accordingly, the staking of the sintered element to fix it on the seal plate can easily be achieved.

Where the first seal plate is of a generally inverted Z-sectioned annular shape or of a generally L-sectioned annular shape, the following structures can be employed. It is, however, to be noted that where the second axial cylindrical wall is employed, it is applicable only to the seal plate of a generally inverted Z-sectioned annular shape.

The radial wall of the first seal plate may have an inner peripheral portion and an outer peripheral portion staggered relative to each other in an axial direction of the bearing assembly.

The multipolar magnet may fixed to the radial wall of the first seal plate by staking an outer peripheral portion of the radial wall of the first seal plate.

An outer cylindrical wall or flange extending axially from the radial wall of the first seal plate may be provided at circumferential locations with a plurality of circumferentially spaced plastically deformable portions protruding radially inwardly thereof and the multipolar magnet overlapped on the radial wall of the first seal plate may then be fixed in position by staking the plastically deformable portions.

The multipolar magnet may fixed to the radial wall of the first seal plate by staking of plastically deformable pawls formed in an outer peripheral portion of the radial wall of the first seal plate.

The present invention in accordance with the first aspect thereof furthermore provides a method of mounting a magnetic encoder on an outer periphery of an encoder carrier member, wherein the magnetic encoder includes a multipolar magnet formed of a sintered element prepared by sintering a powdery mixture of a magnetic powder and a non-magnetic metallic powder and having a plurality of magnetic poles alternating with each other in a direction circumferentially thereof, and a core metal supporting the multipolar magnet and wherein the multipolar magnet is fixed on the core metal by means of a staking technique to provide a sintered element/core metal assembly and an anticorrosive resinous coating is formed over an entire surface of the sintered element/core metal assembly by means of a surface treatment. This mounting method includes, when the magnetic encoder is press-fitted on the outer periphery of the encoder carrier member, heating one of a press-fitting punch and the magnetic encoder to a temperature within the range of 60 to 150° C.

The present invention in accordance with a second aspect thereof provides a magnetic encoder which includes a multipolar magnet having a plurality of magnetic poles alternating with each other in a direction circumferentially thereof, and a core metal supporting the multipolar magnet. The multipolar magnet is formed of a sintered element prepared by sintering a powdery mixture of a magnetic powder and a non-magnetic metallic powder containing at least a powder of copper.

This magnetic encoder is used with the multipolar magnet positioned in face-to-face relation with a magnetic sensor in order to detect the rotational speed. When this magnetic encoder is rotated, passage of the alternating poles of the multipolar magnet is detected by the magnetic sensor, which in turn provides a train of pulses representing the number of revolutions. Since the multipolar magnet is prepared from the sintered element, increase of the amount of the magnetic powder becomes possible, thinning the magnetic encoder and also allowing the magnetic encoder to have an excellent frictional resistance.

Also, since the multipolar magnet is prepared from the sintered element of a composition containing the magnetic powder and the non-magnetic metallic powder containing at least a powder of copper, the magnet has an excellent toughness and an excellent elongation. In other words, when a powder of a rare earth magnetic material is mixed with, as a binder, a powder of non-magnetic metal having a low melting point such as tin or zinc, a predetermined amount of the copper powder is mixed to provide a powdery mixture, which is subsequently sintered at a temperature higher than the melting point of those metals having the low melting point, the tin powder or zinc powder mixed with the copper powder forms a solid solution together with the copper particles and, therefore, the tin or zinc will not dissolve from the sintered element. Also, since the tin or zinc, which is a metal having a low melting point, forms a solid solution with or is alloyed with the copper, the binding force of the particles forming the mixed raw material increases with the toughness of the eventually formed sintered element increased considerably, accompanied by increase of the elongation.

If the toughness of the multipolar magnet prepared from the sintered element is excellent, the multipolar magnet is robust against cracking during, for example, transportation of the magnetic encoder or incorporation of the magnetic encoder into the core metal. The magnetic encoder is also robust against vibrations and/or collision with stones during the use of the magnetic encoder in an automotive vehicle. If the toughness of the multipolar magnet is low, the elongation will hardly occur and cracking is apt to develop and, therefore, utmost care is required in handling. However, the increased toughness is effective to facilitate elongation with the handing capability increased consequently.

In the second aspect of the present invention, the magnetic powder may be prepared from a compound of samarium or a compound of neodymium. If the powder of samarium compound or the powder of neodymium compound is used, a strong magnetic force can be obtained. For the samarium powder, a powder of samarium iron nitrogen type (SmFeN) can be suitably employed. For the neodymium powder, a powder of neodymium iron boron type (NdFeB) can be suitably employed. Other than those specific kinds of powders, the magnetic powder may be a gas atomized powder of manganese aluminum (MnAl) particles.

Also, in the second aspect of the present invention, the non-magnetic metallic powder may be prepared from a mixture of copper and tin particles or a mixture of copper and zinc particles. A series of experiments conducted have shown that where the non-magnetic metallic powder having the low melting point is a powder of tin or zinc, the copper powder may be mixed with the tin powder or zinc powder and the resultant mixture, when sintered at a temperature higher than the melting point of the tin or zinc powder, provides an increased toughness of the sintered element.

The powder mixture may include two or more kinds of magnetic powders or three or more kinds of non-magnetic metallic powders. In such case, the sintered element or the multipolar magnet having a desired characteristic can be obtained by mixing the magnetic powder or the non-magnetic metallic powder in a desired ratio.

A wheel support bearing assembly is also provided in accordance with the second aspect of the present invention. This wheel support bearing assembly is equipped with the magnetic encoder of the structures described before. This magnetic encoder of the present invention, while securing a sufficient magnetic force required to achieve a stabilized sensing, has no problem associated with the handling and, therefore, the incorporation of this magnetic encoder in the wheel support bearing assembly can provide a high productivity.

The wheel support bearing assembly according to the second aspect of the present invention is for rotatably supporting a vehicle wheel relative to a vehicle body structure and includes an outer member having an inner peripheral surface formed with a plurality of outer raceway grooves, an inner member having an outer peripheral surface formed with a corresponding number of inner raceway grooves in alignment with the outer raceway grooves and positioned inside the outer member with an annular bearing space defined between it and the outer member, a row of rolling elements received in part within each of the outer raceway grooves and in part within the mating inner raceway groove, and a sealing unit for sealing one of opposite open ends of an annular bearing space defined between the outer and inner members, respectively. A component part of this sealing unit is employed in the form of the magnetic encoder.

In such case, the sealing unit may include a first seal plate of a generally L-sectioned annular shape mounted on one of the outer and inner members, which is a rotating side, and including an axial cylindrical wall and a radial wall extending radially from the axial cylindrical wall, a second seal plate of a generally L-sectioned annular shape mounted on the other of the outer and inner members, which is a stationary side, in face-to-face relation with the first seal plate and including an axial cylindrical wall and a radial wall extending radially from the axial cylindrical wall, and an elastic sealing member fixedly mounted on the second seal plate and including at least one side sealing lip slidingly engageable with the radial wall of the first seal plate and a radial sealing lip slidingly engageable with the cylindrical wall of the first seal plate. This first seal plate serves as the core metal of the magnetic encoder and the multipolar magnet is mounted on the radial wall of the first seal plate in partly overlapped relation therewith.

In the wheel support bearing assembly according to the second aspect of the present invention, since a component part of the sealing unit is employed in the form of the magnetic encoder, the number of component parts of the sealing unit need not be increased and the rotation of the vehicle wheel can be detected with a compact structure of the bearing assembly. Also, where the magnetic encoder is employed in the sealing unit, sliding engagement of the side sealing lip and the radial sealing lip both fixedly mounted on the second seal plate are in sliding contact with the first seal plate, providing an excellent sealing effect.

According to the second aspect of the present invention, The first seal plate referred to above may be of a generally inverted Z-sectioned annular shape and includes a first axial cylindrical wall mounted on one of the outer and inner members, which is on a rotating side, a radial wall extending radially from the first axial cylindrical wall and a second axial cylindrical wall or flange extending axially from the radial wall in a direction counter to the first axial cylindrical wall. If the first seal plate is of a generally Z-sectioned annular shape as described above, the second axial cylindrical wall can be used for staking of the sintered element and the staking of the sintered element to fix it on the first seal plate can easily be achieved.

Where the first seal plate is of a generally Z-sectioned annular shape or of a generally L-sectioned annular shape, the following structures can be employed. It is, however, to be noted that where the second axial cylindrical wall is employed, it is applicable only to the seal plate of a generally Z-sectioned annular shape.

The radial wall of the first seal plate may have an inner peripheral portion and an outer peripheral portion staggered relative to each other in an axial direction of the bearing assembly.

A cylindrical wall or flange extending axially from the radial wall of the first seal plate may be provided at circumferential locations with a plurality of circumferentially spaced plastically deformable portions protruding radially inwardly thereof and the multipolar magnet overlapped on the radial wall of the first seal plate may then be fixed in position by staking the plastically deformable portions.

The multipolar magnet may fixed to the radial wall of the first seal plate by staking plastically deforming pawls formed in an outer cylindrical wall or flange extending axially from the radial wall of the first seal plate.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 19 is a chart showing the sequence of manufacturing a sintered element from a green compact;

FIG. 20A is a fragmentary perspective view showing a modified core metal that can be employed in the magnetic encoder according to the second embodiment;

FIG. 20B is a fragmentary perspective view of the modified core metal, shown together with a multipolar magnet mounted on the modified core metal;

DETAILED DESCRIPTION OF THE EMBODIMENTS

Figure 1A:
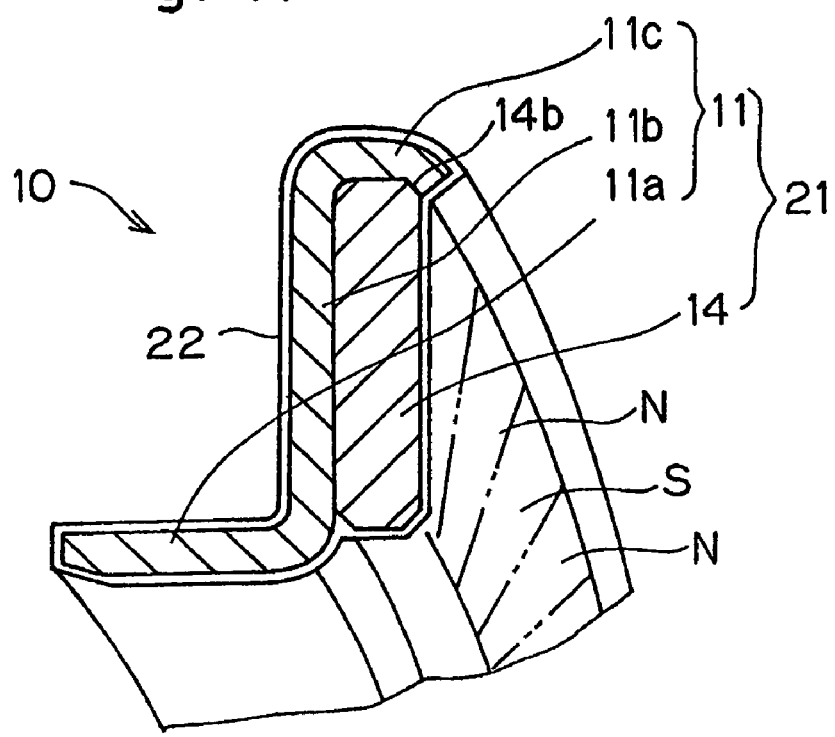
FIG. 1A is a fragmentary perspective view of a magnetic encoder according to a first preferred embodiment of the present invention.

Referring first to FIGS. 1A to 4, a magnetic encoder 10 in accordance with a first preferred embodiment of the present invention will be described. The magnetic encoder 10 includes an annular core metal 11, made of a metallic material, and an annular multipolar magnet 14 secured to an annular surface of the core metal 11 in a direction circumferential of the core metal 11. The annular multipolar magnet 14 is in the form of a multipolar disc magnetized in a direction circumferentially thereof to provide a plurality of magnetic poles N and S that alternate with each other in the circumferential direction. The magnetic poles N and S alternate with each other in the circumferential direction of the multipolar magnet 14 at intervals of a predetermined pitch p along the pitch circle diameter PCD (shown in FIG. 2).

The multipolar magnet 14 is made of a sintered element manufactured by sintering a green compact containing a mixture of a powder of magnetic material and a powder of non-magnetic metallic material and is fixedly retained by the core metal 11 by the use of a staking technique as will be detailed later. An assembly 21 in which the sintered element, i.e., the multipolar magnet 14 is fixed to the core metal 11 is surface treated to have a resinous coating 22 for anticorrosion purpose.

Figure 3:
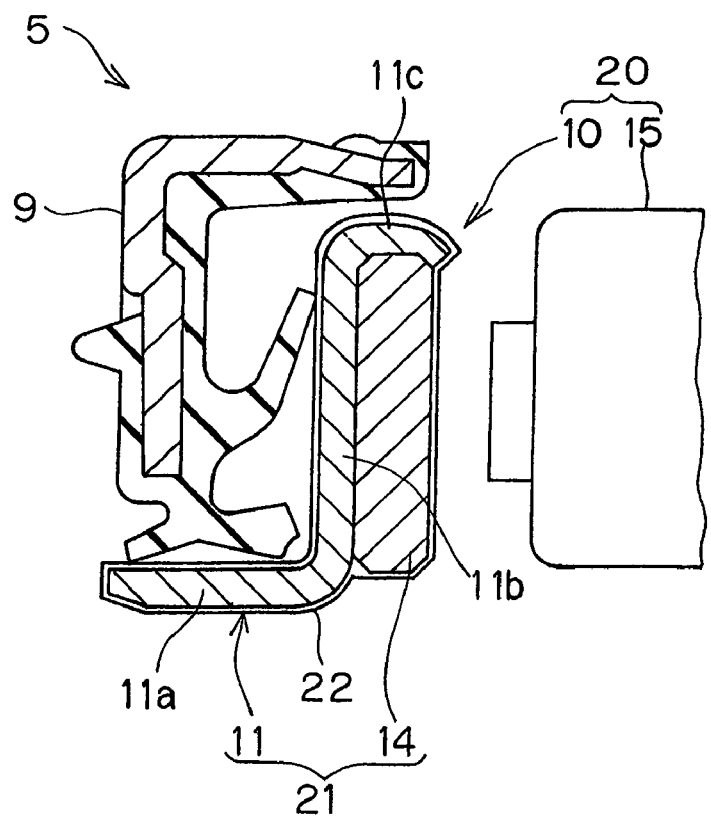
FIG. 3 is a fragmentary longitudinal sectional view of the magnetic encoder, shown together with a sealing unit and a magnetic sensor.

The magnetic encoder 10 is mounted on a rotating member (not shown) and cooperates with a magnetic sensor 15, spaced from and positioned in alignment with the multipolar magnet 14 as shown in FIG. 3, to detect the number of revolutions of the rotating element. Thus, the magnetic encoder 10 and the magnetic sensor 15 form respective parts of a rotation detecting device 20 (FIG. 3).

Figure 4:
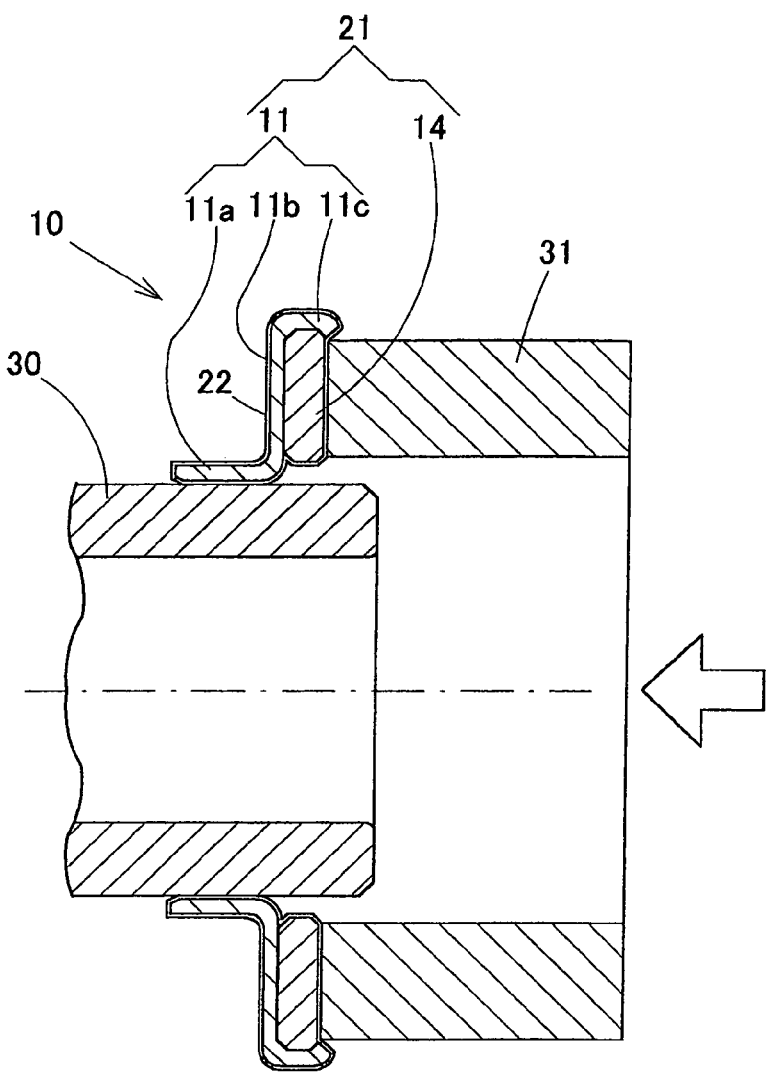
FIG. 4 is a longitudinal sectional view showing the manner in which the magnetic encoder is mounted under interference fit on an encoder carrier member.

FIG. 4 illustrates an example of application of the magnetic encoder 10 as a component part of a sealing unit 5 of a bearing assembly (not shown) and, hence, the rotating element, on which the magnetic encoder 10 is fixedly mounted, is assumed to be one of two cooperating raceway members of the bearing assembly (not shown) that rotates together with the magnetic encoder 10. The sealing unit 5 is made up of the magnetic encoder 10 and a stationary sealing member 9 secured to the other of the two cooperating raceway members of the bearing assembly, which is a stationary element.

The powdery magnetic material contained in the multipolar magnet 14 may be a powder of isotropic or anisotropic ferrite material of a barium or strontium system. The ferrite powder may be a mass of granular powder or a pulverized powder of a wet-type anisotropic ferrite core. Where the pulverized powder of the wet-type anisotropic ferrite core is used, it is necessary to prepare a green compact formed in a magnetic field from a powdery mixture of the pulverized powder with the powdery non-magnetic metallic material.

Also, he powdery magnetic material may be a magnetic powder of a rare earth system. By way of example, it may be a magnetic powder of a samarium iron nitrogen (SmFeN) system or a magnetic powder of a neodymium iron boron (NdFeB) system. The powdery magnetic material may also be suitably employed in the form of a gas atomized powder of manganese aluminum (MnAl).

The powdery magnetic material referred to above may be a mixture of two or more of a magnetic powder of a samarium iron nitrogen (SmFeN) system, a magnetic powder of a neodymium iron boron (NdFeB) system and a gas atomized powder of a manganese aluminum (MnAl). By way of example, a mixture of the magnetic powder of the samarium iron nitrogen (SmFeN) system and the magnetic powder of the neodymium iron boron (NdFeB) system, or a mixture of the gas atomized powder of the manganese aluminum and the magnetic powder of the samarium iron nitrogen system, or a mixture of the magnetic powders of the samarium iron nitrogen system, the neodymium iron boron system and the gas atomized powder of the manganese aluminum can be conveniently employed for the powdery magnetic material. Specifically, where the sole use of the ferrite powder appears to result in an insufficient magnetic force, the ferrite powder may be mixed with a required amount of the magnetic powder of the samarium iron nitrogen system or the magnetic powder of the neodymium iron boron system so that the multipolar magnet 14 can provide an increased magnetic force while being manufactured inexpensively.

The powdery non-magnetic metallic material contained in the multipolar magnet 14 may be a powder of one of tin, copper, aluminum, nickel, zinc, tungsten and manganese or a metallic powder of non-magnetic stainless steel, or a mixture of two or more of them, or an alloyed powder of two or more of them.

A metallic material that can be used to form the core metal 11 is preferably a ferromagnetic material and, for example, a steel plate having a magnetic property and a rust preventive property can be suitably employed therefor. Examples of such steel plate include a stainless steel plate of a ferrite system (SUS 430 or the like according to the JIS Standard) or a rolled steel plate treated to have a rust resistant property, and so on.

Figure 1B:
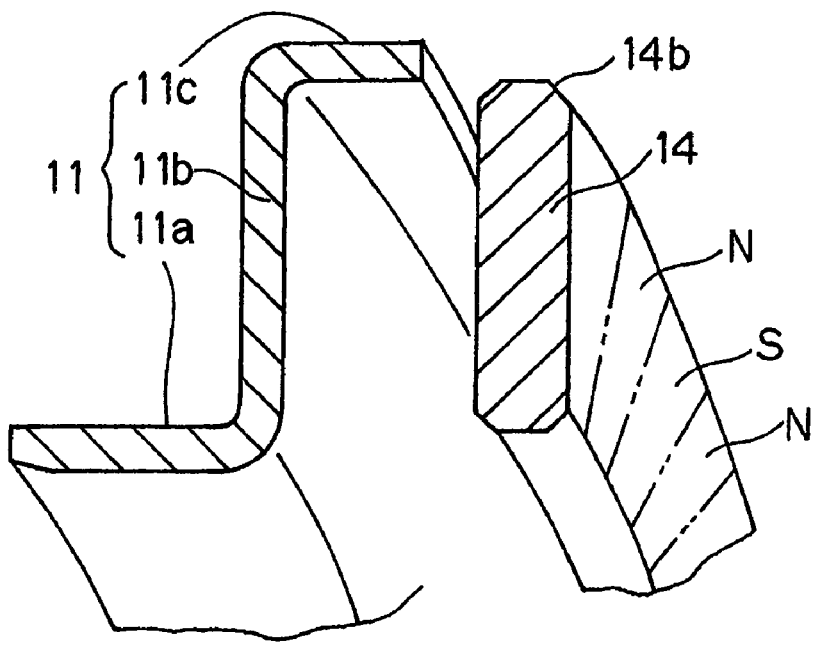
FIG. 1B is a fragmentary perspective view showing the manner in which the magnetic encoder of FIG. 1A is assembled.
Figure 2:
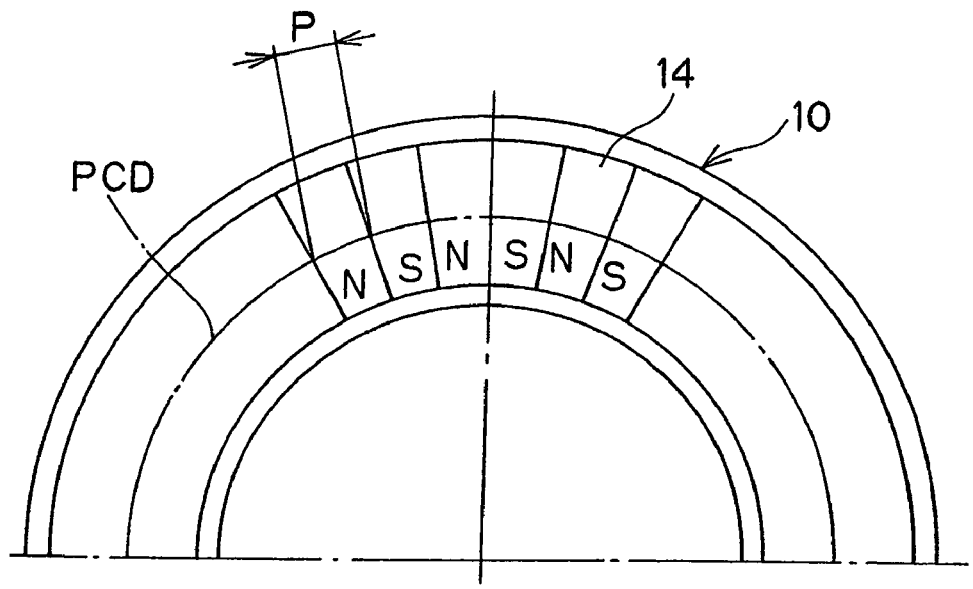
FIG. 2 is a fragmentary front elevational view of the magnetic encoder of FIG. 1A.

The core metal 11 is of any suitable annular configuration and preferably has a shape capable of permitting the multipolar magnet 14 to be fixed thereto. In particular, the core metal 11 preferably has such a shape that the multipolar magnet 14 can be mechanically fixed to the core metal 11 by means of staking or crimping.

Where the multipolar magnet 14 is fixed in position by the use of a staking technique, the core metal 11 is of a generally inverted Z-sectioned annular shape including, as best shown in FIG. 1B, an axial cylindrical wall 11a adapted to be mounted on the rotating element, a radial wall 11b extending radially outwardly from one end of the axial cylindrical wall 11a, and a cylindrical flange 11c extending axially outwardly from an outer end of the radial wall 11b in a direction counter to the axial cylindrical wall 11a and lying substantially perpendicular to the radial wall 11b.

It is to be noted that the core metal 11 may alternatively be of a generally L-sectioned annular shape, in which case the cylindrical flange 11c is dispensed with. In the case where the core metal 11 is of a generally L-sectioned annular shape discussed above, a plurality of circumferentially spaced pawls or fingers, for example, have to be formed integrally with the outer end of the radial wall 11b so that the multipolar magnet 14 can be retained in position on the core metal 11 with the pawls or fingers staked inwardly.

The core metal 11 of FIG. 11B including the axial cylindrical wall 11a, the radial wall 11b and the cylindrical flange 11c is formed of a metallic plate such as a steel plate by the use of any known press work. The radial wall 11b is of an annular flat shape. The sintered element having not yet been magnetized is placed flat against one of the opposite annular surfaces of the radial wall 11b and the cylindrical flange 11c is then staked radially inwardly so as to fix the sintered element to the core metal 11 in overlapped relation. An assembly of the core metal 11 and the sintered element forms a sintered element/core metal assembly 21.

The cylindrical flange 11c has a free end portion opposite to a base end portion continued from the radial wall 11b and a part or the entirety of the free end portion defines a staking area that is staked radially inwardly to fix the sintered element to the core metal 11 in the manner described above. This staking area of the cylindrical flange 11c extends over the entire circumference of the cylindrical flange 11c and, hence, the entire circumference of the core metal 11 and represents an annular shape.

A portion of the sintered element, which is fixed by the cylindrical flange 11c, is chamfered to define a setback surface area 14b. This setback surface area 14b is set backwards from one of the opposite annular surfaces of the sintered element and, hence, the multipolar magnet 14, which confronts and is to be sensed by the magnetic sensor 15 (FIG. 3), so that the staking area of the cylindrical flange 11c does not excessively protrude over such to-be-sensed surface of the sintered element.

In the embodiment so far described, the staking of the staking area of the cylindrical flange 11c is staked over the entire circumference thereof. However, the staking area may be staked partially as shown in FIGS. 5 and 6.

Figure 5:
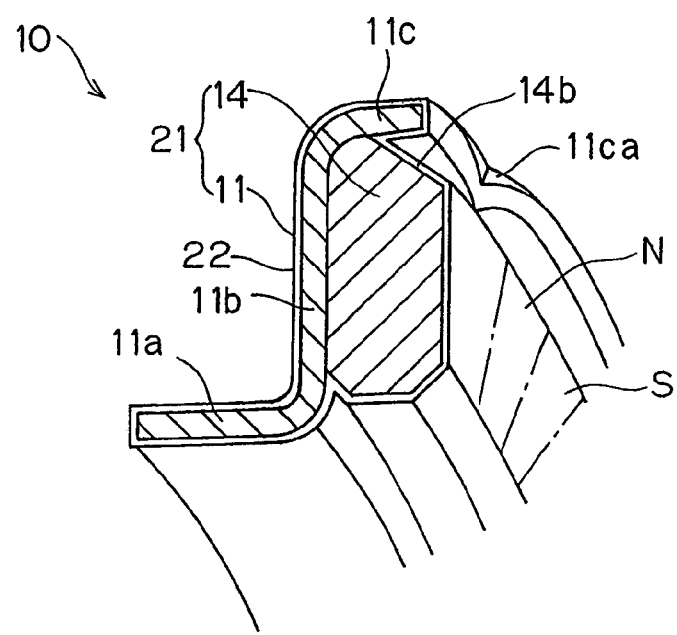
FIG. 5 is a fragmentary perspective view of the magnetic encoder with a modified core metal.
Figure 6:
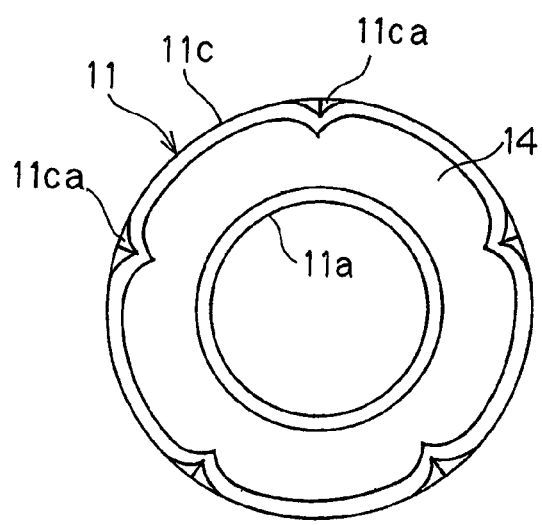
FIG. 6 is a front elevational view of the magnetic encoder of FIG. 5.

More specifically, in the modification shown in FIGS. 5 and 6, the core metal 11 is of a generally inverted Z-sectioned annular shape including an axial cylindrical wall 11a adapted to be mounted on the rotating element, a radial wall 11b extending radially outwardly from one end of the axial cylindrical wall 11a, and a cylindrical flange 11c extending axially from an outer end of the radial wall 11b in a direction counter to the axial cylindrical wall 11a and lying substantially perpendicular to the radial wall 11b, as is the case with that shown in and described with reference to FIGS. 1A and 1B. However, the cylindrical flange 11c has a base end portion continued from the radial wall 11b and a free end portion opposite to the base end portion. The free end portion is formed with a plurality of portions 11ca plastically deformed so as to protrude radially inwardly and spaced a predetermined distance from each other in a direction circumferentially of the flange 11c. The portions 11ca are deformed by, for example, a staking technique. The plastically deformed portions 11ca when so deformed fixes the multipolar magnet 14 to the radial wall 11b of the core metal 11.

Even in this modification, an outer peripheral portion of the multipolar magnet 14 is chamfered to define a setback surface area 14b that is fixed by the portions 11ca. The surface area 14b is set backwards from the to-be-sensed annular surface of the multipolar magnet 14 so that the plastically deformed portions 11ca does not protrude over the to-be-sensed surface of the multipolar magnet 14. The setback surface area 14b is formed as an inclined surface.

Figure 7:
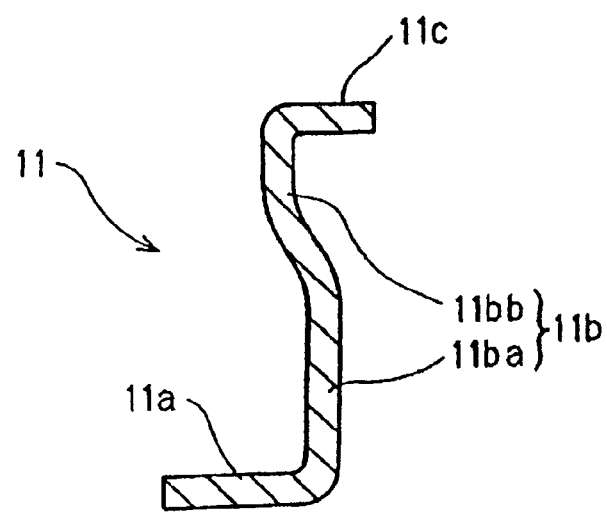
FIG. 7 is a fragmentary longitudinal sectional view showing a further modified core metal that can be employed in the magnetic encoder.

In any of the core metals 11 shown in and described with reference to FIGS. 1A and 1B and FIGS. 5 and 6, respectively, the radial wall 11b of the core metal 11 may be of an axially staggered structure including, as shown in FIG. 7, an inner peripheral portion 11ba and an outer peripheral portion 11bb, which are axially offset relative to each other. In this further modification shown in FIG. 7, although not shown therein, the multipolar magnet 14 is secured to one of opposite annular surfaces of the radial wall 11b on one side in which the cylindrical flange 11c protrudes axially, i.e., confronts the magnetic sensor 15 (FIG. 3), as is the case with that shown in and described with reference to FIGS. 1A and 1B.

Figure 8A:
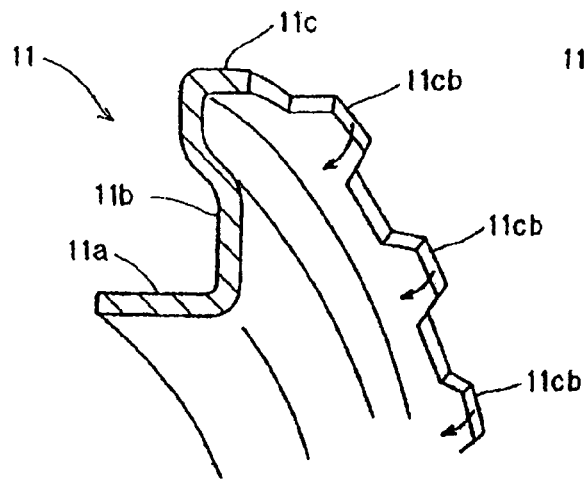
FIG. 8A is a fragmentary perspective view showing a still further modified core metal that can be employed in the magnetic encoder.
Figure 8B:
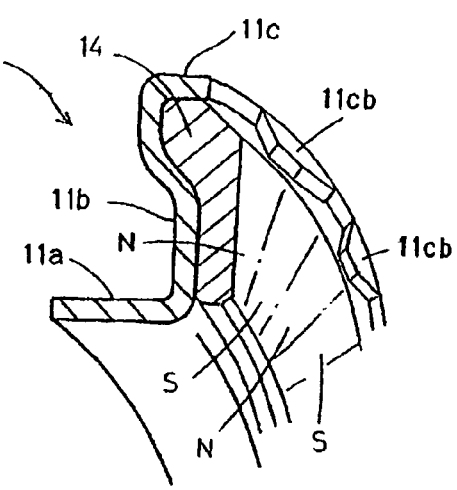
FIG. 8B is a fragmentary perspective view of the still further modified core metal, shown together with a multipolar magnet mounted in the core metal.

Also, as represented by a still further modification shown in FIGS. 8A and 8B, the free end portion of the cylindrical flange 11c of the core metal 11 of the generally Z-sectioned shape may be formed with a plurality of circumferentially spaced, generally tongue-shaped discrete pawls 11cb, which are plastically deformed, i.e., bent radially inwardly to fixed the multipolar magnet 14 to the radial wall 11b of the core metal 11.

Even in this still further modification shown in FIGS. 8A and 8B, the multipolar magnet 14 is secured to one of the opposite annular surfaces of the radial wall 11b on one side in which the cylindrical flange 11c protrudes axially, i.e., confronts the magnetic sensor 15 (FIG. 3), as is the case with that shown in and described with reference to FIGS. 1A and 1B. Also, the radial wall 11b is shown to be of an axially staggered structure as is the case with that shown in and described with reference to FIG. 7. Where the radial wall 11b employs the axially staggered structure, one of the opposite annular surfaces of the multipolar magnet 14 facing the radial wall 11b may be so configured at to follow the axially staggered contour of the radial wall 11b.

The sintered element/core metal assembly 21 in which the sintered element is fixed to the core metal 11b y a staking technique in the manner described above is surface coated with a resinous coating 22 by means of an electrodeposition technique to complete the magnetic encoder 10. The electrodeposition technique used to form the coating 22 is a process in which an electric current is applied to the sintered element/core metal assembly 21, while the assembly 21 is immersed in a bath of an aqueous coating material, to chemically form the resinous coating 22 on the entire surface of the assembly 21 by means of electrophoresis.

The electrodeposition process now available in the art is broadly classified into an anion electrodeposition, in which the sintered element/core metal assembly 21 is electrically connected to a plus polarity, and a cation electrodeposition, in which the sintered element/core metal assembly 21 is electrically connected to a minus polarity. Where the magnetic encoder 10 is utilized as mounted in a wheel support bearing assembly, the magnetic encoder 10 is required to have an anticorrosive property and, therefore, the use of the cation electrodeposition process is preferred to form the resinous coating 22 on the encoder 10. The resinous coating 22 so formed preferably contains a water content not higher than 10% and formation of the resinous coating 22 is finalized by drying and baking.

The electrodeposition process is particularly advantageous in that it can achieve a uniform coating for even an article having considerable surface irregularities, as compared with the solvent based coating process and also achieve a good adherence of the coating material. Also, if a masking technique is employed in the practice of the electrodeposition process, a two-color coating can be easily accomplished by a combined use of the electrodeposition coating and plating methods or by twice repeating the electrodeposition method. For this reason, with the electrodeposition process, side end portions, which cannot be relatively easily coated with the currently available clear paint of a modified epoxy system by means of a dipping technique or a spray coating technique, can be satisfactorily coated, with the coatability consequently increased considerably.

Also, with the electrodeposition method, the electrophoresis allows the coating material to adhere to and penetrate into the crimping area and radially inner side end portions of the sintered element/core metal assembly 21 and, the coating material so adhering and penetrating can act as a bonding agent to connect the sintered element (the multipolar magnet 14) and the core metal 11. Accordingly, as compared with the dipping or spray technique by which the currently available clear paint of a modified epoxy system is coated, the adhesion between the sintered element (the multipolar magnet 14) and the core metal 11 can be considerably increased.

Figure 9:
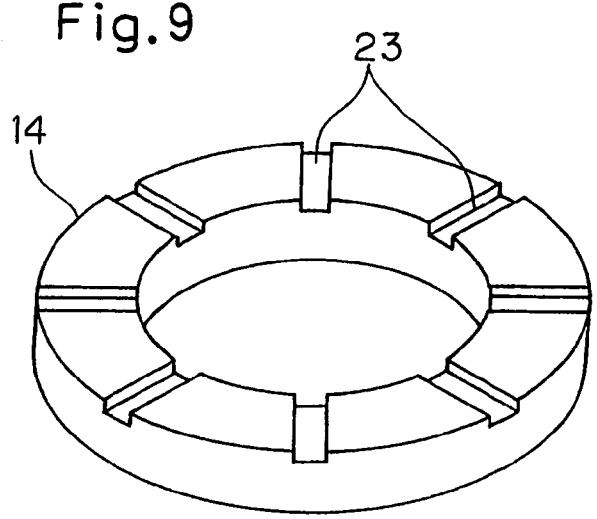
FIG. 9 is a perspective view of the multipolar magnet, showing the details of a rear side thereof.
Figure 10:
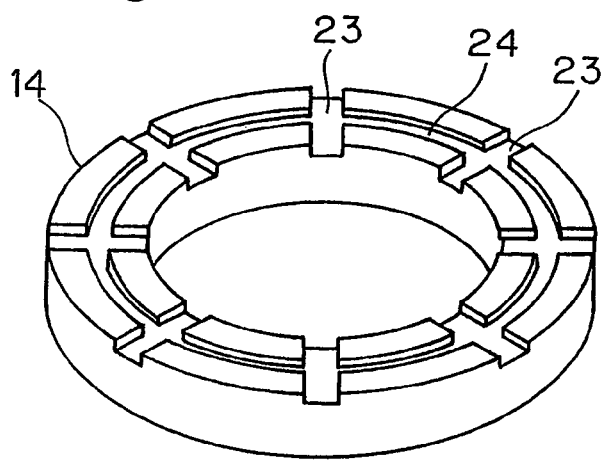
FIG. 10 is a perspective view showing a modified multipolar magnet having a rear side thereof that is different from that shown in FIG. 9.

Also, if desired to enhance the adhesion between the sintered element (the multipolar magnet 14) and the core metal 11 in the sintered element/core metal assembly 21, one of the opposite annular surfaces of the sintered element (the multipolar magnet 14) that is held in contact with the radial wall 11b of the core metal 11, that is, a rear surface of the sintered element may be formed with a plurality of grooves 23 and 24 as shown in FIG. 9 and FIG. 10 so that the aqueous coating material to be electrodeposited can flow through those grooves 23 or 24.

Specifically, the grooves 23 shown in FIG. 9 are arranged in a radial pattern, extending in a direction radially of the sintered element (the multipolar magnet 14), whereas the groove 24 shown in FIG. 10 is arranged in a ring pattern extending concentric with the sintered element (the multipolar magnet 14) so as to traverse the grooves 23.

Formation of the grooves 23 and 24 in the rear surface of the sintered element (the multipolar magnet 14) allows the aqueous electrodeposition coating material to penetrate into those grooves 23 and 24 by the effect of the electrophoresis during the electrodeposition and then allows the sintered element and the core metal 11 to be bonded to each other by the electrodeposition coating material during the subsequent drying and baking.

Although the grooves 23 and 24 of FIGS. 9 and 10 have been described and shown as formed on the rear surface of the sintered element (the multipolar magnet 14), similar grooves may alternatively be formed in the core metal 11 so as to extend in the radial wall 11b or from the radial wall 11b to the cylindrical flange 11c.

Figure 11:
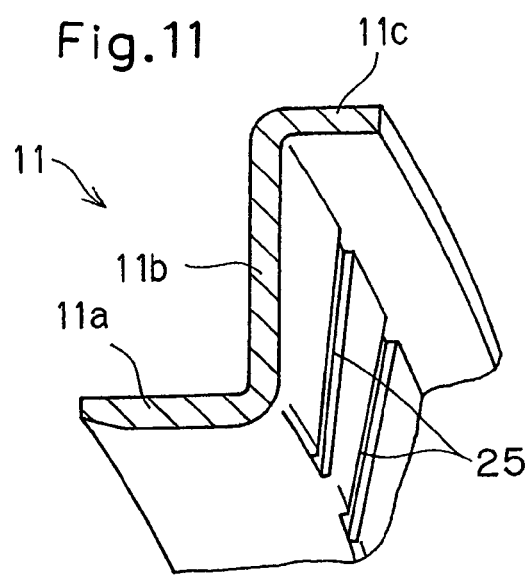
FIG. 11 is a fragmentary perspective view showing a still further modified core metal that can be employed in the magnetic encoder.
Figure 12:
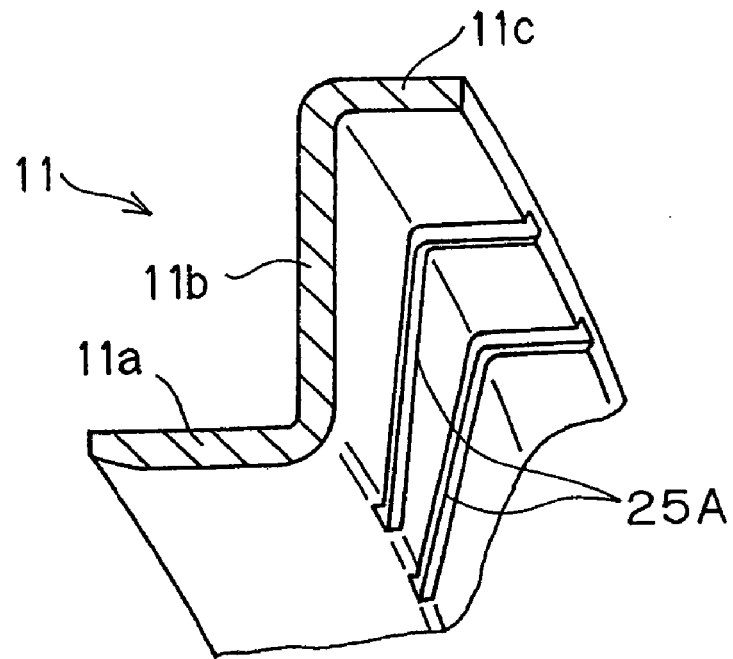
FIG. 12 is a fragmentary perspective view showing a yet further modified core metal that can be employed in the magnetic encoder.
Figure 13:
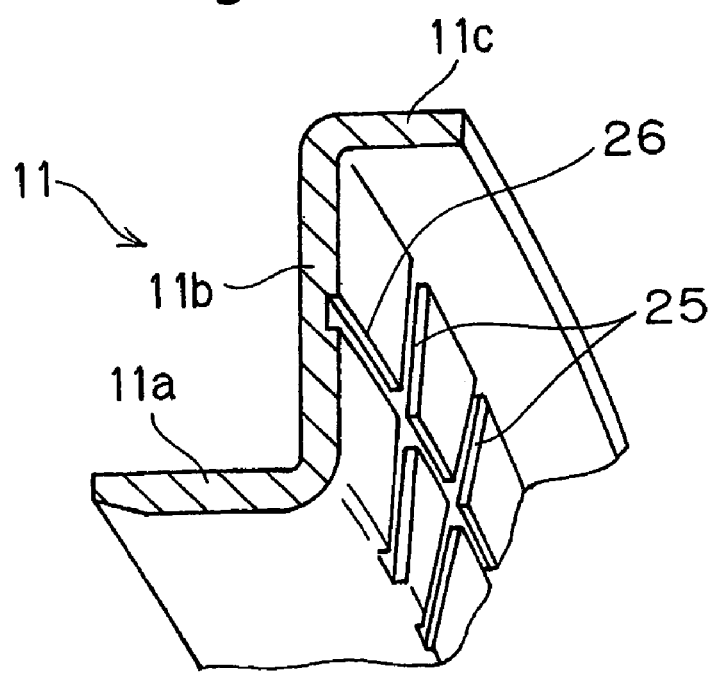
FIG. 13 is a fragmentary perspective view showing a yet further modified core metal that can be employed in the magnetic encoder.

In the modification shown in FIG. 11, grooves 25 are formed in one of the opposite annular surfaces of the radial wall 11b of the core metal 11, which confronts the sintered element (the multipolar magnet 14), so as to extend radially in a radial pattern by means of a machining or cutting technique. In the modification shown in FIG. 12, grooves 25A are formed in part in that one annular surface of the radial wall 11b and in part in the cylindrical flange 11c by a machining or cutting technique. In the modification shown in FIG. 13, the radial grooves 25 and a ring-shaped groove 26 are formed on that one surface of the radial wall 11b by a machining or cutting technique. The groove 26 is concentric with the core metal 11 and traverses the radial grooves 25. Those grooves 25, 25A and 26 bring about effects similar to those brought about by the grooves 23 and 24 of FIGS. 9 and 10.

As hereinbefore described with reference to FIG. 3, the magnetic encoder 10 of the structure hereinbefore described is used for detecting the number of revolutions of, for example, an encoder carrier member 30 of FIG. 4, with the multipolar magnet 14 held in face-to-face relation with the magnetic sensor 15. When the magnetic encoder 10 is rotated, passage of the opposite magnetic poles N and S of the multipolar magnet 14 can be detected by the magnetic sensor 15, which detects the rotation in the form of a train of pulses. Since the pitch p (FIG. 2) of the poles N and S in the multipolar magnet 14 can be set to a small value if so desired. For example, the pitch p can be chosen to be 1.5 mm, and, accordingly, the precision of ±3% of a single pitch deviation can be achieved, allowing the rotation detection with a high accuracy. The term "single pitch deviation" referred to above means the difference in pitch p between the magnetic poles detected at the position spaced a predetermined distance from the magnetic encoder 10, which is expressed by the ratio relative to a target pitch. Where the magnetic encoder 10 is employed in the sealing unit 5 of the bearing assembly as shown in FIG. 3, the number of revolutions of the bearing assembly, on which the magnetic encoder 10 is mounted, can be detected.

Referring now to FIG. 4, when the magnetic encoder 10 is press-fitted on an outer periphery of the encoder carrier member 30, a cylindrical press-fitting punch 31 is used for the press-fitting. Specifically, where the magnetic encoder 10 is mounted on a raceway member, for example, a rotatable inner race of the bearing assembly, such rotatable inner race will be the encoder carrier member 30. The press-fitting of the magnetic encoder 10 onto the inner race of the bearing assembly is carried out by bringing the press-fitting punch 31 into contact with a front annular surface of the sintered element (the multipolar magnet 14) of the magnetic encoder 10 and then pushing the press-fitting punch 31 until the magnetic encoder 10 reaches a desired position on the inner race.

During the execution of the press-fitting, one or both of the press-fitting punch 31 and the magnetic encoder 10 are heated to a temperature within the range of 60 to 150° C. and, more preferably, within the range of 80 to 120° C. As a matter of course, an annular free end face of the press-fitting punch 31 pushing the sintered element (the multipolar magnet 14) contacts a portion of the resinous coating 22, which is deposited on the front surface of the sintered element (the multipolar magnet 14).

As hereinbefore described, the magnetic encoder 10 has its entire surfaces deposited with the anti-corrosive resinous coating 22. This resinous coating 22 required to exhibit a satisfactory anticorrosive property must have a film thickness of about 10 μm particularly where the coating material used to form the resinous coating 22 is prepared from an epoxy resin. In practice, however, the required film thickness of the resinous coating 22 may vary depending on the kind of the resin.

In the case of the electrodeposition coating material, the resinous coating 22 can be generally formed to a film thickness equal to or greater than 15 μm. A similar film thickness equal to or greater than 15 μm can also be secured even where the commercially available modified epoxy clear paint is coated by means of the dipping or coating technique. In the event that during the execution of any of the electrodeposition, dipping or spraying techniques scratches are formed in the resinous coating 22, or in the event that during baking of the coating 22 pinholes are formed in the resinous coating 22, the resultant resinous coating 22 would have a film thickness not greater than 5 μm at localized sites.

However, in the practice of the present invention, since as hereinbefore described one or both of the press-fitting punch 31 and the magnetic encoder 10 is heated to a temperature within the range of 60 to 150° C. when the magnetic encoder 10 is press-fitted onto the encoder carrier member 30, the resinous coating 22 is heated to soften. Specifically, when the press-fitting punch 31 is heated, heat evolved in the press-fitting punch 31c an be transmitted to the resinous coating 22 and the resinous coating 22 is softened. Once the resinous coating 22 is so softened, the resinous coating 22 is fluidized to flow into the scratches and pinholes to fill up those defects to thereby smoothen or level the resinous coating 22. Since the scratches and pinholes disappear in this way, the resultant resinous coating 22 can have a film thickness equal to or greater than 5 μm, exhibiting an enhanced anticorrosive property.

It is to be noted that if the heating temperature is lower than 60° C., the resinous coating 22 is not softened satisfactorily and, therefore, the resinous coating 22 cannot be smoothened satisfactorily. On the other hand, if the heating temperature is higher than 150° C., the resinous coating 22 can be smoothened satisfactorily, but where the magnetic encoder 10 is used as a component part of the sealing unit 5 as shown in FIG. 3 there is a high possibility that a rubber material, used to form rubber sealing members in the sealing unit 5, or a grease filled in the sealing unit 5 for securing the sealability will be deteriorated.

As discussed above, the resinous coating 22 is effective to allow the magnetic encoder 10 to have an excellent anticorrosive property and also effective to prevent the magnetic encoder 10 from being rusted even if the magnetic encoder 10 is used under severe environments for a prolonged period of time. Thus, the magnetic encoder 10 can satisfactorily be utilized in the wheel support bearing assembly used under the environmental condition which tends to cause rusting.

Also, since the multipolar magnet 14 is made of the sintered element containing the powder of magnetic material, the magnetic encoder 10 can be assembled compact in size and has an excellent anti-frictional property and a high productivity while capable of exerting a sufficient magnetic force required to achieve a stabilized sensing.

In addition, the multipolar magnet 14 has a surface hardness, which is higher than that of the conventional coder utilizing an elastic material, containing a powder of magnetic material or magnetic particles, or an elastomer. Therefore, where the multipolar magnet 14 is used in the rotation detecting device 20 for detecting the number of revolutions of, for example, a vehicle wheel, even when particulate matter such as sand particles is trapped into a gap between the surface of the multipolar magnet 14 mounted on a rotating side and the surface of the magnetic sensor 15 on a stationary side during run of the automotive vehicle, the multipolar magnet 14 is less susceptible to frictional wear and damage and, as compared with the conventional magnet prepared of an elastic material, an effect of considerably reducing the frictional wear can advantageously be obtained.

In summary, the foregoing embodiment including the various modifications thereof can bring about the following meritorious advantages.

Since when the magnetic encoder 10 including the sintered element/core metal assembly 21 having been surface treated to have the anticorrosive resinous coating 22 is press-fitted onto the encoder carrier member 30, one or both of the press-fitting punch 31 and the magnetic encoder 10 is heated to a temperature within the range of 60 to 150° C., reduction in film thickness of portions of the resinous coating 22, where scratches and/or pinholes are formed during the surface treatment, can be compensated for by the film thickness smoothing effect brought about when the resinous coating 22 is softened, with the anticorrosive property increased consequently.

Since the electrodeposition process provides a good adherence as compared with the coating process, the product as a whole can be coated and, therefore, the anticorrosive property of the sintered element (the multipolar magnet 14) can be increased advantageously.

Since the electrodeposition process provides a good adherence as compared with the coating process, the electrodeposition coating material can easily enter a gap between the sintered element (the multipolar magnet 14) and the core metal 11 to exhibit a bonding effect between them and, by means of the staking and the bonding, the sintered element and the core metal can be retained in a firmly integrated fashion. Even though the staking is insufficient and loose, the bonding effect acts to avoid an undesirable separation between the sintered element and the core metal 11 and, therefore, the reliability of the product can be increased.

As compared with the coating process, the electrodeposition process is effective to provide a coating of a uniform film thickness and, therefore, the products can easily controlled as to their dimensions.

If one or both of the sintered element (the multipolar magnet 14) and the core metal 11 is formed with the grooves, the adhesion between the sintered element and the core metal 11c an further be increased.

Hereinafter, the present invention will be demonstrated by way of specific examples which are not intended to limit the scope of the present invention, but are shown only for the purpose of explanation. Accordingly, it is believed that other features and advantages of the invention will become apparent to those skilled in the art from the following descriptions of the illustrative examples.

EXAMPLES 1 to 5

Five samples (for Examples 1 to 5, respectively) of the magnetic encoders 10 were prepared and tested in the manner described below and evaluated as shown in Table 1.

The sintered element (the multipolar magnet 14) in each of those samples was made of a green compact, 54 mm. dia.×66 mm. dia.×1.5 mm in size. The green compact was of a composition containing one or a mixture of the magnetic powder of samarium iron nitrogen (SmFeN) and the magnetic powder of neodymium iron boron (NdFeB), as shown in Table 1, in admixture with a binder (Sn) in a quantity as shown in Table 1 and the non-magnetic metallic powder. The green compact was press molded to the specific size, followed by baking under the atmosphere for 1 hour to provide the sintered element 14.

This sintered element 14 was subsequently mounted on the core metal 11 by means of the staking technique to provide the sintered element/core metal assembly 21, followed by the surface treatment to form the resinous coating 22 on the sintered element/core metal assembly 21 in a manner specified in Table 1. During the surface treatment, the cleansing condition and the baking condition were adjusted so that pinholes could be easily formed in the resinous coating for the purpose of the tests. Portions of the coating where the pinholes were made for the purpose of tests have a film thickness of 2 to 3 μm. It is, however, to be noted that the adjustment was made so that the film thickness of the resinous coating 22 of the present invention attained about 15 μm.

The resultant magnetic encoder 10 (the sample for each Examples 1 to 5) was combined with a sealing member 9 shown in FIG. 3 to provide the sealing unit 5 and was subsequently press-fitted on the outer periphery of the encoder carrier member 30 (shown in FIG. 4) of a structure resembling a bearing inner race. At the time of press-fitting, one or both of the press-fitting punch and sintered element/core metal assembly (hence, the magnetic encoder 10 for each of Examples 1 to 5) was heated at the temperature as specified in Table 1. It is to be noted that the multipolar magnet 14 employed in the magnetic encoder 10 was not magnetized and, hence, remained in the form of the sintered element.

Each of the samples was subjected to the two tests, i.e., a test to determine the film thickness of a portion of the resinous coating 22 where the pinholes were purposely formed and a test to determine the occurrence of a rusting.

In the film thickness measurement, the film thickness of that pinholed portion of the resinous coating 22 was determined by subtracting the depth of recess of the pinholes from the film thickness of the non-pinholed portion of the resinous coating 22 and the depth of recesses of the pinholes was determined by means of a measurement of the surface shape.

The test to determine the occurrence of a rusting was carried out by spraying a saline water containing 5% NaCl and heated to 35° C. to the magnetic encoder 10. The magnetic encoder 10 was observed after 500 hours subsequent to the saline water spraying for the presence or absence of a rusting in the pinholed portion of the resinous coating 22. In the Table 1 below, the case in which the rusting was observed is marked by X and the case in which no rusting was observed is marked by O. With respect to the cases marked by O, the cases were again tested in the same manner to determine the presence or absence of a rusting and observed after 800 hours subsequent to the saline water spraying, and were marked by OO where no rusting was observed.

The magnetic encoder 10 in each of those Examples included the sintered element/core metal assembly 21 in which the sintered element (the multipolar magnet 14) contained the Sm—Fe—N magnetic powder and which was electrodeposited by means of a cation electrodeposition process and the magnetic encoder 10 was subsequently press-fitted on the outer periphery of the encoder carrier member 30 resembling the bearing inner race at the temperature within the range of 60 to 150° C. Table 1 makes it clear that the film thickness of the pinholed portion of the resinous coating 22 deposited on the sintered element (the multipolar magnet 14) of Examples 1 to 5 was within the range of 6 to 10 μm and the respective anticorrosive properties of Examples 1 to 5 were all rated by O.

EXAMPLE 6

Using the Sm—Fe—N magnetic powder for the sintered element (the multipolar magnet 14), the sintered element/core metal assembly 21 was cation electrodeposited to provide the magnetic encoder 10 which was subsequently press-fitted on the outer periphery of the encoder carrier member 30 resembling the bearing inner race with the sintered element/core metal assembly 21 kept in a condition heated to a predetermined temperature (100° C.). In this Example, the film thickness of the pinholed portion of the resinous coating 22 deposited on the sintered element (the multipolar magnet 14) was 10 μm and the anticorrosive property was excellent as rated by OO.

EXAMPLE 7

Using the Sm—Fe—N magnetic powder for the sintered element (the multipolar magnet 14), the sintered element/core metal assembly 21 was cation electrodeposited to provide the magnetic encoder 10 which was subsequently press-fitted on the outer periphery of the encoder carrier member 30 resembling the bearing inner race with both of the press-fitting punch and the sintered element/core metal assembly 21 kept in a condition heated to a predetermined temperature (100° C.). In this Example, the film thickness of the pinholed portion of the resinous coating 22 deposited on the sintered element (the multipolar magnet 14) was 10 µm and the anticorrosive property was excellent as rated by OO.

EXAMPLE 8

Using the Nd—Fe—B magnetic powder for the sintered element (the multipolar magnet 14), the sintered element/core metal assembly 21 was anion electrodeposited to provide the magnetic encoder 10 which was subsequently press-fitted on the outer periphery of the encoder carrier member 30 resembling the bearing inner race with the press-fitting punch kept in a condition heated to a predetermined temperature (100° C.). In this Example, the film thickness of the pinholed portion of the resinous coating 22 deposited on the sintered element (the multipolar magnet 14) was 8 µm and the anticorrosive property was excellent as rated by O.

EXAMPLE 9

Using the Sm—Fe—N magnetic powder for the sintered element (the multipolar magnet 14), the sintered element/core metal assembly 21 was coated with a clear paint (of a kind tradenamed TPR-RC Clear, available from Tokyo Paint Co., Ltd.) to provide the magnetic encoder 10 which was subsequently press-fitted on the outer periphery of the encoder carrier member 30 resembling the bearing inner race with the press-fitting punch kept in a condition heated to a predetermined temperature (100° C.). In this Example, the film thickness of the pinholed portion of the resinous coating 22 deposited on the sintered element (the multipolar magnet 14) was 10 µm and the anticorrosive property was excellent as rated by OO.

EXAMPLE 10

Using the Sm—Fe—N magnetic powder for the sintered element (the multipolar magnet 14), the sintered element/core metal assembly 21 was dipped into a bath containing an epoxy clear paint (of a kind tradenamed TPR-RC Clear, available from Tokyo Paint Co., Ltd.), diluted with a thinner, with the resin forced to enter a gap between the sintered element (the multipolar magnet 14) and the core metal 11. The sintered element/core metal assembly 21 was then, after having been removed from the bath a predetermined length of time thereafter, baked at 180° C. for 20 minutes to provide the magnetic encoder 10. The resultant magnetic encoder 10 was subsequently press-fitted on the outer periphery of the encoder carrier member 30 resembling the bearing inner race with the press-fitting punch kept in a condition heated to a predetermined temperature (100° C.). In this Example, the film thickness of the pinholed portion of the resinous coating 22 deposited on the sintered element (the multipolar magnet 14) was 10 µm and the anticorrosive property was excellent as rated by OO.

TABLE 1

| | Composition (wt %) | | | | | Heating Treatment | | Film Thickness of Pinholed | | |
|---|---|---|---|---|---|---|---|---|---|---|
| | Mag. Powder | | Binder | Anti-rusting | | | Temp. | Portion of | Anticorrosive | |
| Ex. | Sm—Fe—N | Nd—Fe—B | Sn | Treatment | Coating | Heated | (° C.) | Coating | Property | Remark |
| 1 | 60 | | 40 | Cation Electrodeposition | Epoxy | Punch | 60 | 6 | ◯ | |
| 2 | 60 | | 40 | Cation Electrodeposition | Epoxy | Punch | 80 | 7 | ◯◯ | |
| 3 | 60 | | 40 | Cation Electrodeposition | Epoxy | Punch | 100 | 8 | ◯◯ | |
| 4 | 60 | | 40 | Cation Electrodeposition | Epoxy | Punch | 120 | 9 | ◯◯ | |
| 5 | 60 | | 40 | Cation Electrodeposition | Epoxy | Punch | 150 | 10 | ◯◯ | |
| 6 | 60 | | 40 | Cation Electrodeposition | Epoxy | Assembly 21 | 100 | 10 | ◯◯ | |
| 7 | 60 | | 40 | Cation Electrodeposition | Epoxy | Punch&Assembly 21 | 100 | 10 | ◯◯ | |
| 8 | | 60 | 40 | Anion Electrodeposition | Epoxy | Punch | 100 | 8 | ◯ | |
| 9 | 60 | | 40 | Coating | Epoxy | Punch | 100 | 10 | ◯◯ | |
| 10 | 60 | | 40 | Dipping | Epoxy | Punch | 100 | 10 | ◯◯ | |

TABLE 2

| | Composition (wt %) | | | | | Heating Treatment | | Film Thickness of Pinholed | | |
|---|---|---|---|---|---|---|---|---|---|---|
| | Mag. Powder | | Binder | Anti-rusting | | | Temp. | Portion of | Anticorrosive | |
| Comp. | Sm—Fe—N | Nd—Fe—B | Sn | Treatment | Coating | Heated | (° C.) | Coating | Property | Remark |
| 1 | 60 | | 40 | Cation Electro-deposition | Epoxy | Punch | 50 | 3 | X | Rubber & Grease Deteriorated |
| 2 | 60 | | 40 | Cation Electro-deposition | Epoxy | Punch | 160 | 10 | ◯◯ | |
| 3 | 60 | | 40 | Cation Electro-deposition | Epoxy | Assembly 21 | 50 | 2 | X | |
| 4 | 60 | | 40 | Cation Electro-deposition | Epoxy | Punch & Assembly 21 | 50 | 3 | X | |

Comparison 1:

Using the Sm—Fe—N magnetic powder for the sintered element (the multipolar magnet 14), the sintered element/core metal assembly 21 was cation electrodeposited to provide the magnetic encoder 10 which was subsequently press-fitted on the outer periphery of the encoder carrier member 30 resembling the bearing inner race with the press-fitting punch kept in a condition heated to 50° C. In this Comparison, the film thickness of the pinholed portion of the resinous coating 22 deposited on the sintered element (the multipolar magnet 14) was 3 μm and the anticorrosive property was not satisfactory as rated by X.

Comparison 2:

Using the Sm—Fe—N magnetic powder for the sintered element (the multipolar magnet 14), the sintered element/core metal assembly 21 was cation electrodeposited to provide the magnetic encoder 10 which was subsequently press-fitted on the outer periphery of the encoder carrier member 30 resembling the bearing inner race with the press-fitting punch kept in a condition heated to 160° C. In this Comparison, the film thickness of the pinholed portion of the resinous coating 22 deposited on the sintered element (the multipolar magnet 14) was 10 μm and the anticorrosive property was excellent. However, due to the high temperature (160° C.), the rubber seal and the grease used to achieve the sealability were deteriorated.

Comparison 3:

Using the Sm—Fe—N magnetic powder for the sintered element (the multipolar magnet 14), the sintered element/core metal assembly 21 was cation electrodeposited to provide the magnetic encoder 10 which was subsequently press-fitted on the outer periphery of the encoder carrier member 30 resembling the bearing inner race with both of the press-fitting punch and the assembly 21 kept in a condition heated to 50° C. In this Comparison, the film thickness of the pinholed portion of the resinous coating 22 deposited on the sintered element (the multipolar magnet 14) was only 2 μm and the anticorrosive property was not satisfactory as rated by X.

Comparison 4:

Using the Sm—Fe—N magnetic powder for the sintered element (the multipolar magnet 14), the sintered element/core metal assembly 21 was cation electrodeposited to provide the magnetic encoder 10 which was subsequently press-fitted on the outer periphery of the encoder carrier member 30 resembling the bearing inner race with both of the press-fitting punch and the assembly 21 kept in a condition heated to 50° C. In this Example, the film thickness of the pinholed portion of the resinous coating 22 deposited on the sintered element (the multipolar magnet 14) was only 3 μm and the anticorrosive property was not satisfactory as rated by X.

Figure 14:
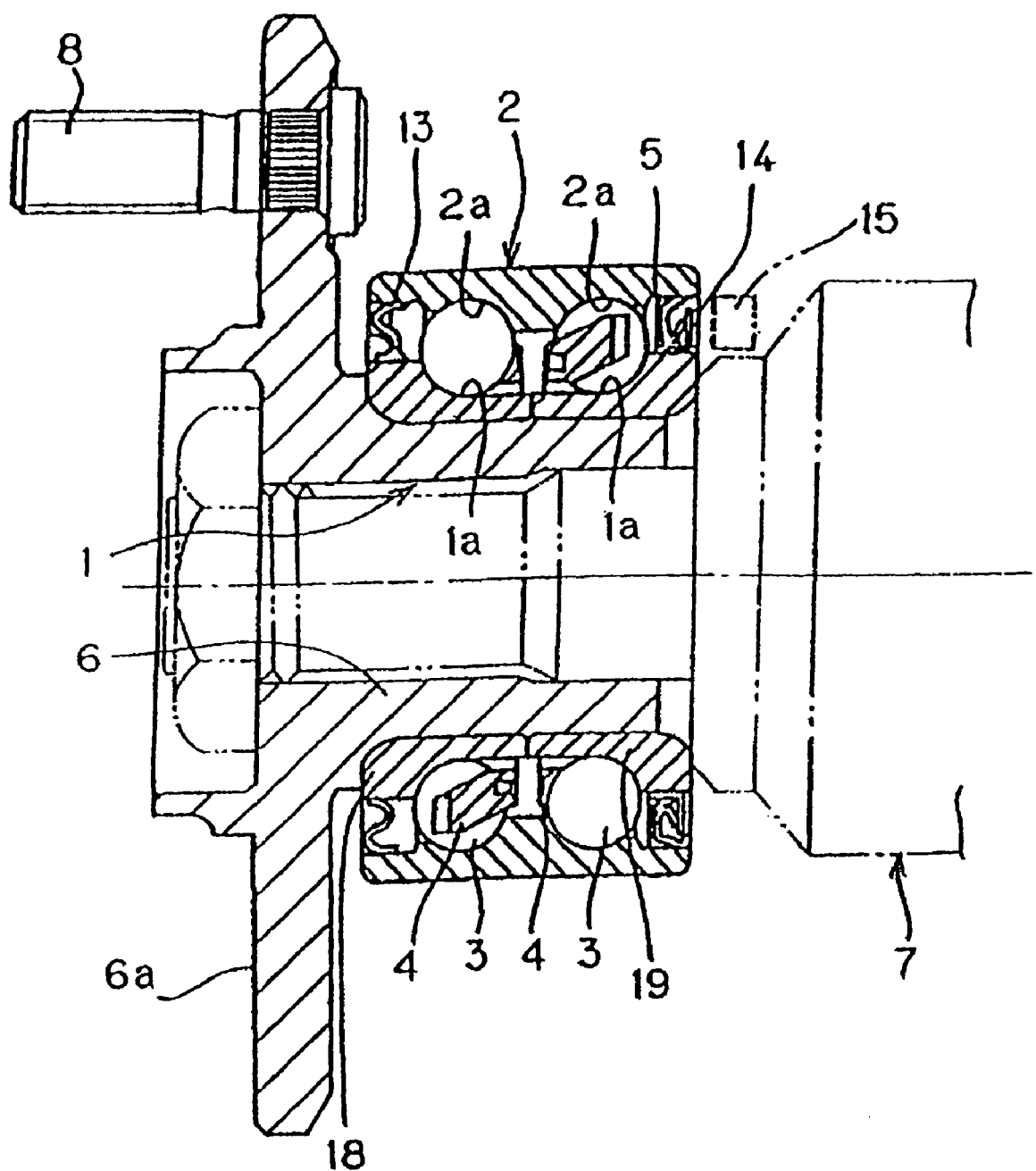
FIG. 14 is a longitudinal sectional view of a wheel support bearing assembly equipped with the magnetic encoder designed in accordance with the first preferred embodiment of the present invention.
Figure 15:
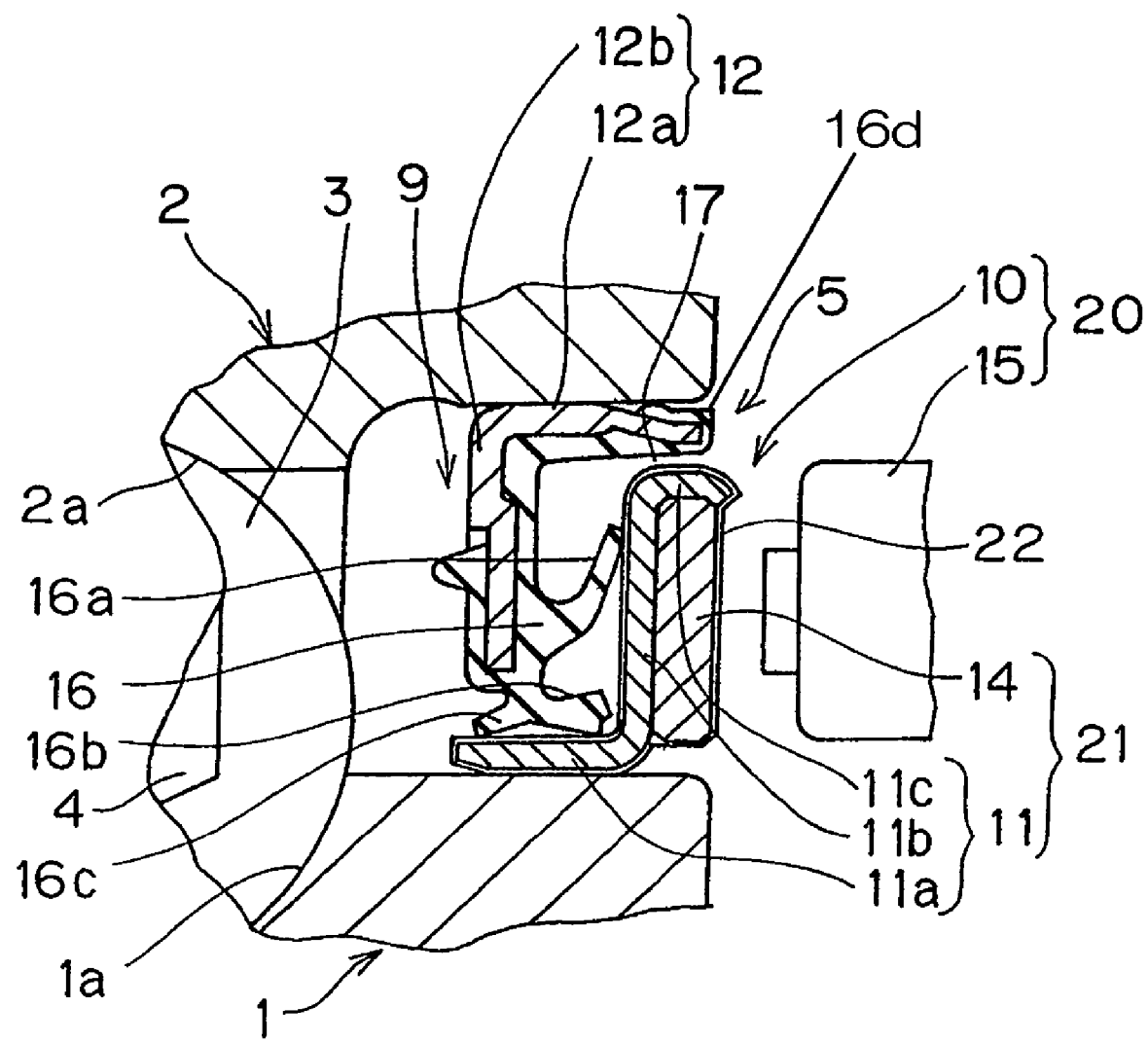
FIG. 15 is a fragmentary longitudinal sectional view showing an important portion of the wheel support bearing assembly shown in FIG. 14.

A specific application of the magnetic encoder 10 of the structure according to the first embodiment of the present invention to the wheel support bearing assembly, as well as the details of the sealing unit 5 employed therein, is shown in FIGS. 14 and 15.

As shown in FIG. 14, the wheel support bearing assembly includes an inner member 1 having a plurality of, for example, two, circumferentially extending inner raceway grooves 1a and 1a defined in an outer peripheral surface thereof, an outer member 2 positioned radially outwardly of the inner member 1, with an annular bearing space defined between the outer member 2 and the inner member 1, and having a corresponding number of circumferentially extending outer raceway grooves 2a and 2a defined in an inner peripheral surface thereof, and rows of rolling elements 3 operatively housed within the annular bearing space and received in part within the inner raceway grooves 1a and 1a and in part within the outer raceway grooves 2a and 2a. Sealing units 5 and 13 are accommodated respectively within opposite open end portions of the annular bearing space between the inner and outer members 1 and 2 to thereby seal the opposite open end portions of the annular bearing space. Of those sealing units, the sealing unit 5 has the magnetic encoder 10 built therein as hereinbefore described.

The inner member 1 and the outer member 2 are rotatable relative to each other through the rolling elements 3 and are members positioned radially inwardly and outwardly of the rows of the rolling elements 3, respectively. The inner member 1 and the outer member 2 may be inner and outer races of the bearing assembly, respectively, or the bearing inner and outer races, respectively, which are combined with separate component parts, respectively. Alternatively, the inner member 1 may be a shaft. The rolling elements 3 may be balls or rollers, but in the instance shown in FIGS. 14 and 15 the balls are employed for the rolling elements 3.

The illustrated wheel support bearing assembly is in the form of a dual row rolling bearing assembly, more specifically a dual row angular ball bearing assembly and the bearing inner race is comprised of two separated but axially butted inner race segments 18 and 19 with the inner raceway grooves 1a and 1a formed on respective outer surfaces of those inner race segments 18 and 19. The inner race segments 18 and 19 are fixedly mounted externally on a shank of a hub axle 6 and cooperates with the hub axle 6 to form the inner member 1. It is, however, to be noted that instead of the use of the three components, that is, the hub axle 6 and the separate inner race segments 18 and 19, the inner member 1 may be of a two-component construction made up of a hub axle, formed integrally with the inner raceway segment 18 and having a raceway groove defined therein, and the other inner race segment 19.

The hub axle 6 is drivingly coupled with one end (for example, an outer race) of a constant velocity universal joint 7, whereas a vehicle wheel (not shown) is fitted to a flange 6a of the hub axle 6 by means of a plurality of bolts 8. The constant velocity universal joint 7 has the opposite end (for example, an inner race) drivingly coupled with a drive shaft. The outer member 2 is defined by a bearing outer race and is fitted to a housing (not shown) which may be a knuckle of the automobile suspension system. The rows of the rolling elements 3 are retained by respective retainers or cages 4.

The details of the sealing unit 5 having the magnetic encoder 10 built therein are shown in FIG. 15 on an enlarged scale. As shown therein, the sealing unit 5 is substantially similar in structure to that shown in FIG. 3. This sealing unit 5 is fixedly mounted on one of the inner and outer members 1 and 2, which is a rotating member, with the magnetic encoder 10 or the core metal 11 serving as a slinger. In the illustrated example, since the rotating member is the inner member 1, the magnetic encoder 10 is fixedly mounted on the inner member 1.

The illustrated sealing unit 5 includes first and second annular seal plates 11 and 12 made of a metal plate and fixed in position to the inner and outer members 2, respectively. The first seal plate 11 is defined by the core metal 11 of the magnetic encoder 10 of the structure described hereinbefore and, therefore, reference will hereinafter be made to the core metal 1, rather than the first seal plate. The magnetic encoder 10 is that shown and described in connection with the first embodiment of the present invention and, therefore, the details thereof are not reiterated for the sake of brevity. As hereinbefore described, the magnetic encoder 10 cooperates with the magnetic sensor 15 positioned in face-to-face relation with the multipolar magnet 14 to form the rotation detecting device 20 for detecting the number of revolutions of a vehicle wheel.

The second seal plate 12 forms the sealing member 9 (FIG. 3) and is integrated with a side sealing lip 16a, slidingly engaged with the radial wall 11b of the core metal 11, which is the first seal plate, and two radial sealing lips 16b and 16c slidingly engageable with the axial cylindrical wall 11a of the core metal 11. These sealing lips 16a to 16c form respective parts of an elastic sealing element 16 bonded by vulcanization to the second seal plate 12.

While in FIG. 15 one side sealing lip 16a and two radial sealing lips 16b and 16c are used, the number of the sealing lips may not be always limited to three and any desired number may be chosen. The second seal plate 12 holds the elastic sealing element 16 in cooperation with the outer member 2, which is a stationary member. In other words, the elastic sealing element 16 has a slipcover 16d which covers an axial free end of a cylindrical wall 12a and an inner peripheral surface of the second seal plate 12, and this slipcover 16d is held in position between the second seal plate 12 and the outer member 2. The cylindrical wall 12a of the second seal plate 12 and the cylindrical flange 11c of the core metal 11, which is the first seal plate, are radially spaced a slight distance from each other with a gap therebetween defining a labyrinth seal 17.

Figure 16:
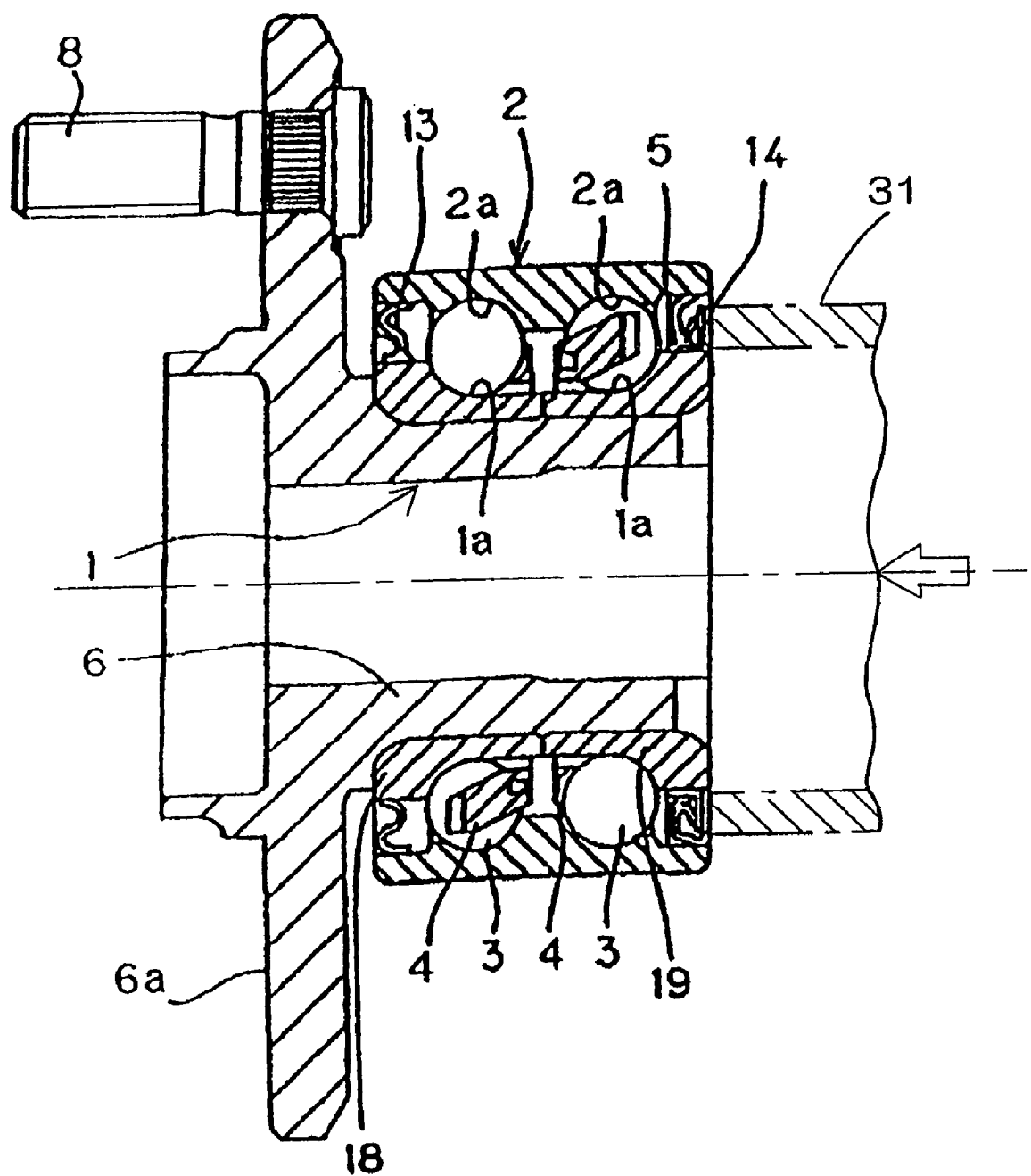
FIG. 16 is a longitudinal sectional view of the wheel support bearing assembly of FIG. 14, showing the manner in which the magnetic encoder is mounted under interference fit on an inner race of the wheel support bearing assembly.

With the cylindrical wall 11a of the core metal 11, which is the first seal plate, press-fitted externally onto the inner race segment 19, the magnetic encoder 10 is fixedly mounted on the inner member 1. The mounting of the magnetic encoder 10 on the inner member 1 is carried out in a manner substantially similar to that shown and described with reference to FIG. 4. More specifically, as shown in FIG. 16, the mounting of the magnetic encoder 10 on the inner member 1 is carried out by bringing the press-fitting punch 31 into contact with the front surface of the sintered element (the multipolar magnet 14) of the magnetic encoder 10 and subsequently pushing the press-fitting punch 31 in an axial direction of the bearing assembly until the magnetic encoder 10 is seated at a predetermined or required position on the inner member 1.

During this mounting, at least one of the press-fitting punch 31 and the magnetic encoder 10 is heated to a temperature within the range of 60 to 150° C. as hereinbefore described with reference to FIG. 4. By so doing, even though scratches and/or pinholes are formed in a portion of the resinous coating 22 when the magnetic encoder 10 is surface treated to form such resinous coating 22 for anticorrosive purpose, those scratches and/or pinholes can advantageously be smoothened and, therefore, reduction in film thickness of the resinous coating 22 can be substantially avoided with the anticorrosive property increased consequently.

With the wheel support bearing assembly with the magnetic encoder 10 mounted therein, rotation of the inner member 1 together with the vehicle wheel can be detected by the magnetic sensor 15 in cooperation with the magnetic encoder 10 mounted on the inner member 1 and, hence, the rotation detecting device 20 can provide an output signal indicative of the number of revolutions of the vehicle wheel.

Since the magnetic encoder 10 forms a component part of the sealing unit 5, the number of revolutions of the vehicle wheel can be detected with no need to increase the number of the component parts used therein. Considering that the wheel support bearing assembly tends to be exposed to severe environments on the road surface and it is quite often that the magnetic encoder is wetted with muddy saline water, the formation of the anticorrosive coating over the entire surface of the sintered element/core metal assembly 21, which forms the magnetic encoder 10, and, also, the heating of one or both of the press-fitting punch 31 and the sintered element/core metal assembly 21 during the press-fitting allow the magnetic encoder 10 from rusting, which would otherwise result from when wetted with the saline muddy water.

Also, while it is also quite often that particles such as sand particles are trapped in between the magnetic encoder 10 and the magnetic sensor 15 facing the magnetic encoder 10, the multipolar magnet 14 prepared from the sintered element as hereinbefore described is so hard that frictional wear and/or damage appearing on the surface of the multipolar magnet 14 can be considerably reduced as compared with the conventional counterpart made of an elastic material.

With respect to the sealing between the inner and outer members 1 and 2, it can be achieved by the sliding engagement of the various sealing lips 16a to 16c, provided in the second seal plate 12, and the labyrinth seal 17 defined by a slight gap between the cylindrical wall 12a of the second seal plate 12 and the cylindrical wall or flange 11c of the core metal 11, which is the first seal plate.

It is to be noted that although the wheel support bearing assembly shown in FIGS. 1A and 1B or FIG. 15 has been described and shown as including the core metal 11 of the magnetic encoder 10, which is so configured as shown in FIGS. 1A and 1B, the core metal 11 of the magnetic encoder 10 may be of the structure shown in and described with reference to any one of FIG. 5 to FIGS. 8A and 8B.

It is also to be noted that where the magnetic encoder 10 is used as a component part of the sealing unit 5 used in the bearing assembly, the multipolar magnet 14 may be positioned in a manner reverse to that described in connection with any of the foregoing embodiments so as to be oriented inwardly. In other words, the multipolar magnet 14 may be positioned so as to face axially inwardly of the bearing assembly with respect to the core metal 11. In such case, the core metal 11 is preferably made of a non-magnetic material. In addition, in the case of the wheel support bearing assembly, in which the outer member serves a rotating member, the magnetic encoder is mounted on the outer member.

Figure 17A:
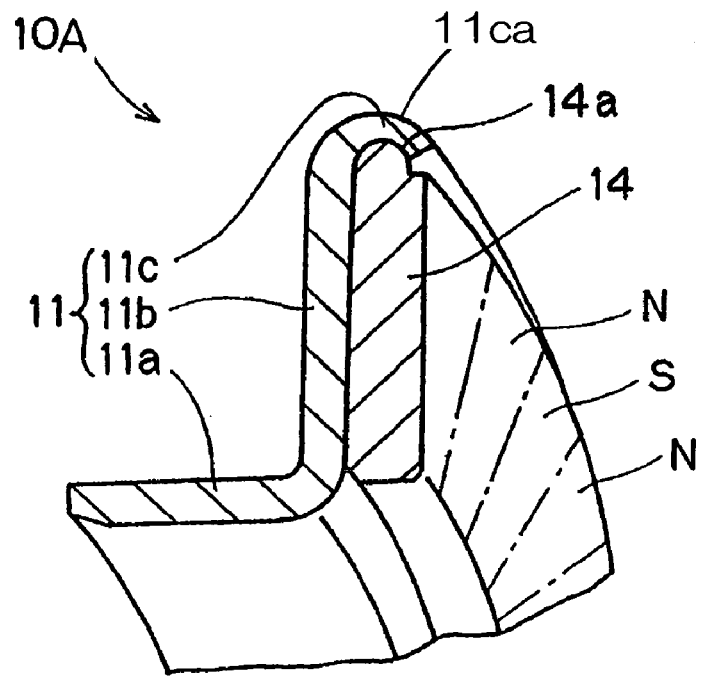
FIG. 17A is a fragmentary perspective view of a magnetic encoder according to a second preferred embodiment of the present invention.
Figure 17B:
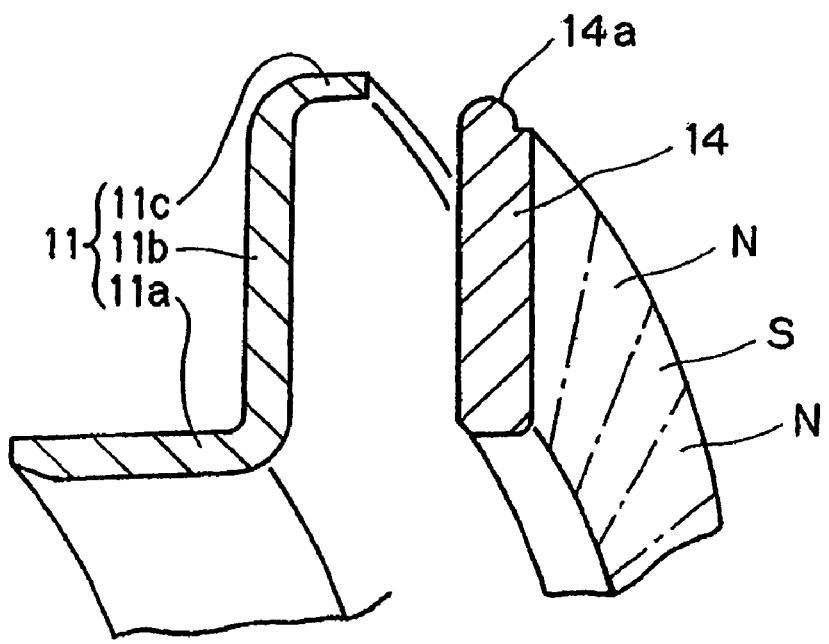
FIG. 17B is a fragmentary perspective view showing the manner in which the magnetic encoder of FIG. 17A is assembled.
Figure 18:
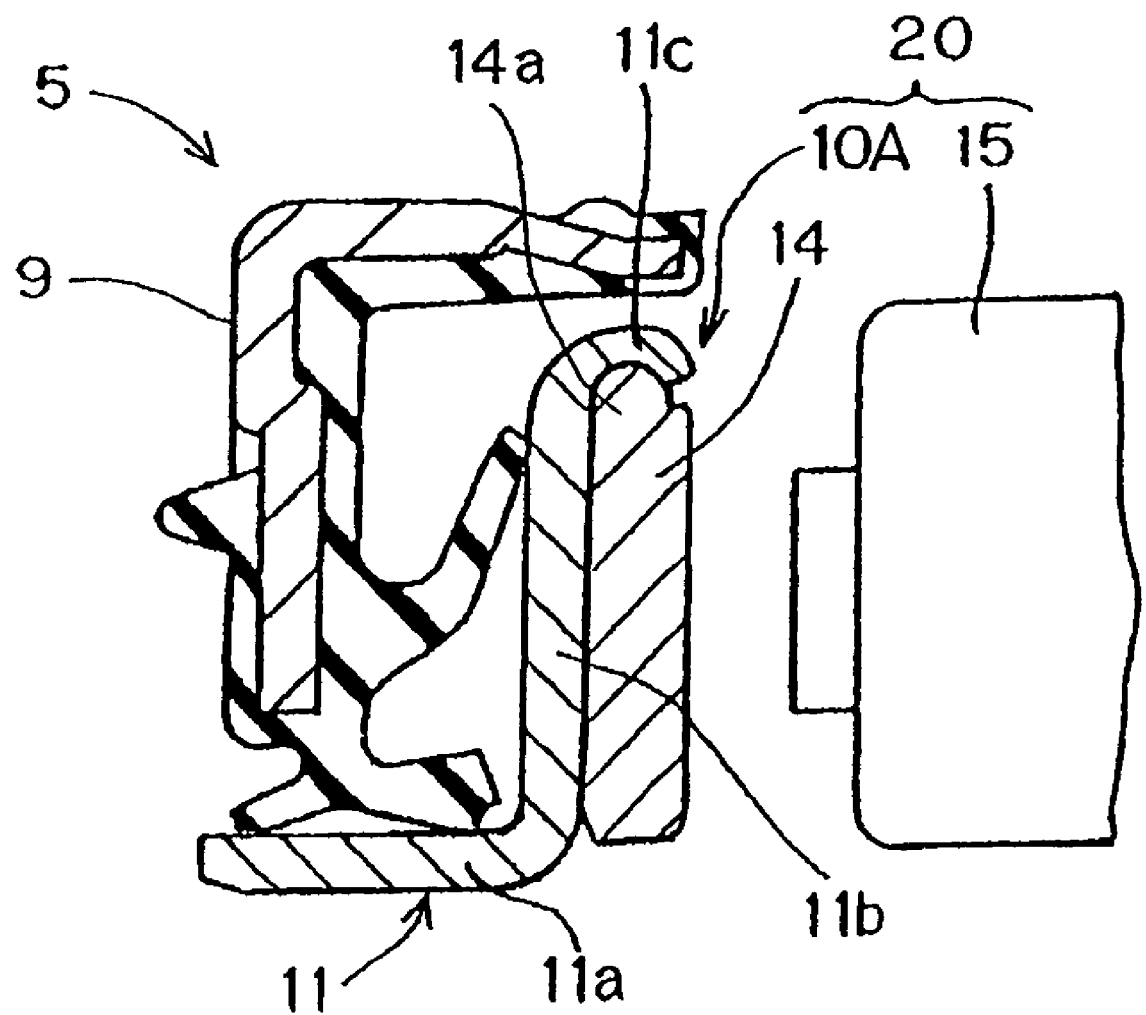
FIG. 18 is a fragmentary longitudinal sectional view of the magnetic encoder of FIG. 17A, shown together with a sealing unit and a magnetic sensor.

FIGS. 17A to 18 illustrates a second embodiment of the present invention. In this embodiment, the multipolar magnet 14 is a sintered element prepared from a green compact containing a powder of magnetic material and a powder of non-magnetic metallic material including at least a powder of copper. This multipolar magnet 14 is fixed to the core metal 11 of a generally inverted Z-sectioned annular configuration by staking the core metal 11. However, unlike that designed according to the first embodiment of the present invention, the sintered element/metal core assembly, i.e., the assembly of the core metal 11 integrated with the sintered element, has no anticorrosive resinous coating formed over the entire surface thereof Except for the absence of the anticorrosive resinous coating, other structural features of and materials used to form the magnetic encoder according to the second embodiment of the present invention is similar to those of the magnetic encoder 10 shown and described in connection with the first embodiment.

It is, however, to be noted that that portion of the multipolar magnet 14, which is fixed by staking of the cylindrical wall 11c of the core metal 11, is set backwardly to define an annular recess 14a so that when the annular free end 11ca of the cylindrical flange 11c is plastically deformed to fix that portion of the multipolar magnet 14, the plastically deformed annular free end 11ca of the cylindrical flange 11c does not protrude over an to-be-sensed surface of the multipolar magnet 14. The annular recess 14a is specifically in the form of a step set backwardly from the to-be-sensed surface of the multipolar magnet 14 a distance corresponding to the wall thickness of that plastically deformed free end 11ca of the cylindrical flange 11c of the core metal 11. On the other hand, the rear surface of the multipolar magnet 14 opposite to the to-be-sensed front surface has an outer peripheral portion which represents a substantially arcuate section, and the plastically deformed annular free end 11ca of the cylindrical flange 11c of the core metal 11, which fixes the recess 14a, follows the contour of that outer peripheral portion of the rear surface of the multipolar magnet 14.

For the non-magnetic metallic powder as a binder used to form the multipolar magnet 14, a powder of one of tin, copper, aluminum, nickel, zinc, tungsten, manganese and non-magnetic stainless metal, or a powdery mixture of two or more of them, or an alloyed powder of two or more of them can be suitably employed.

Copper particles forming the copper powder that can be employed in the practice of the present invention may have various shapes such as dendritic, flaky, angular, globular, irregular, granulate and so on. In order for the copper powder to provide a high moldability and a high sintering ability, a mass of dendritic copper particles or a mass of a mixture of the dendritic copper particles and copper particles of other shapes is conveniently employed for the copper powder. Since the use of the powder containing the dendritic copper particles will result in increase of the strength of the eventually prepared green compact and also increase of the area of the surface wetted with a melt of a metal having a low melting point during sintering, the eventually prepared sintered element can have a considerably increased physical strength.

For the manufacture of the copper powder, any of the electrolysis process, the stamping process, the pulverizing process, the gas atomization process, the water atomization process, the heat treatment process and the chemical process can be employed. In particular, the electrolysis process is preferred for the manufacture of the powder containing the dendritic copper particles that can provide a high moldability and a high sintering ability.

The copper particles have an average particle size preferably within the range of 0.11 to 200 μm and, more preferably, within the range of 3 to 100 μm. If the average particle size is smaller than 0.1 μm, the copper powder lacks a sufficient fluidity as a raw material and will pose a difficulty in filling up in a stable fashion the mold cavity of a mold assembly used to form the green compact. On the other hand, if the average particle size is greater than 200 μm, the strength of the eventually formed green compact will not increase even though the dendritic copper particles are employed.

In the composition of the powdery mixture of the magnetic powder and the non-magnetic metallic powder used to make the multipolar magnet 14, the quantity of the magnetic powder is preferably within the range of 10 to 80 wt % relative to the total weight of the powdery mixture. If the quantity of the magnetic powder is smaller than 10 wt %, the magnetic force of the multipolar magnet 14 would be insufficient. On the other hand if the quantity of the magnetic powder is greater than 80 wt %, the physical strength of the sintered element would be insufficient.

Where the non-magnetic metallic powder is of a composition containing the copper powder and a powder of a metal having a low melting point such as tin or zinc, the mixing ratio thereof, when expressed in terms of percent by weight, is preferably within the range of (9.5:0.5) to (0.5:9.5). If the quantity of the copper powder in the composition of the non-magnetic metallic powder is greater than 95 wt % relative to the total weight of the non-magnetic metallic powder, the quantity of the powder of the low melting point metal will become too small and the physical strength of the sintered element would be so insufficient that the sintered element can no longer be used in the practice of the present invention. On the other hand, if the quantity of the copper powder is smaller than 5 wt %, the quantity of the powder of the low melting point metal, that can not be used to form an alloy during the molding of the green compact, will become large and, therefore, the resultant green compact will become fragile.

The green compact so molded can, when sintered within a furnace as shown in FIG. 19, become the sintered element of a disc shape. The heating atmosphere within the sintering furnace is not specifically limited to a particular atmosphere and any of the atmosphere, the vacuum or the reducing atmosphere can be employed. The sintering may be carried out within an electric furnace or a vacuum furnace, or a pusher furnace with an inert gas flowing thereinto or an inert furnace. However, the use of a nitrogen-enriched atmosphere in the sintering furnace is preferred in terms of the anticorrosive property. Where the green compact is sintered under the nitrogen-enriched atmosphere, oxidization of the magnetic powder can advantageously be minimized It is to be noted that the core metal 11 may alternatively be of a generally L-sectioned annular shape as shown in FIGS. 20A and 20B, in which case the cylindrical flange 11c shown in FIG. 17B is dispensed with. In the case of the core metal 11 of the generally L-sectioned annular shape, a plurality of circumferentially spaced pawls or fingers 11ba, for example, have to be formed integrally with the radially outer end of the radial wall 11b so that the multipolar magnet 14 can be retained in position on the core metal 11 by staking the pawls or fingers 11ba inwardly.

Also, even in this second embodiment of the present invention, as represented by the modification shown in FIGS. 8A and 8B, the free end portion of the cylindrical flange 11c of the core metal 11 of the generally inverted Z-sectioned shape may be formed with a plurality of circumferentially spaced, generally tongue-shaped discrete pawls 11cb, which are plastically deformed, i.e., bent radially inwardly as shown by arrows to fix the multipolar magnet 14 to the radial wall 11b of the core metal 11.

Figure 21:
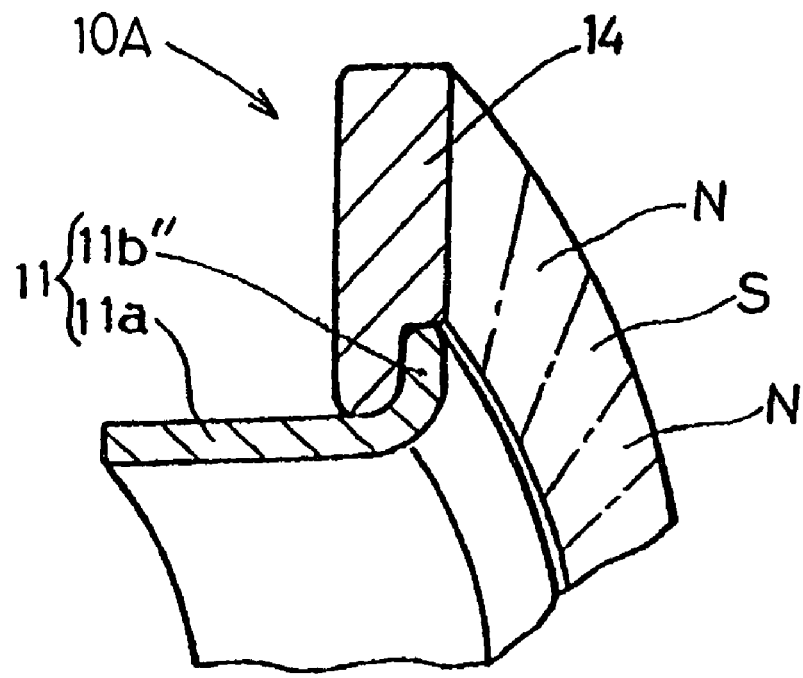
FIG. 21 is a fragmentary perspective view of a magnetic encoder according to a third preferred embodiment of the present invention.

By way of example, as represented by a third preferred embodiment of the present invention shown in FIG. 21, the core metal 11 may be of a generally L-sectioned annular shape including an axial cylindrical wall 11a and a radial wall 11b" protruding a relatively small distance radially outwardly from the cylindrical wall 11a. The core metal 11 employed in the practice of the third embodiment of the present invention is also of one-piece construction made up of the cylindrical wall 11a and the radial wall 11b" and can be formed by the use of any known press work from a single metal plate such as a steel plate. The radial wall 11b" is of a substantially flat annular configuration. The disc-shaped sintered element, which eventually forms the multipolar magnet 14, can be fixed to the cylindrical wall 11a by press-fitting the sintered element onto an outer periphery of the cylindrical wall 11a until the sintered element reaches the radial wall 11b". The height of the radial wall 11b", that is, the distance over which the radial wall 11b" protrudes radially outwardly from the cylindrical wall 11a is so chosen that an outer edge of the radial wall 11b" can be brought into contact with an inner periphery of the multipolar magnet 14 in a radial direction of the multipolar magnet 14, and is therefore small as compared with the height of the radial wall 11b shown in and described with reference to FIGS. 17A and 17B.

Figure 22:
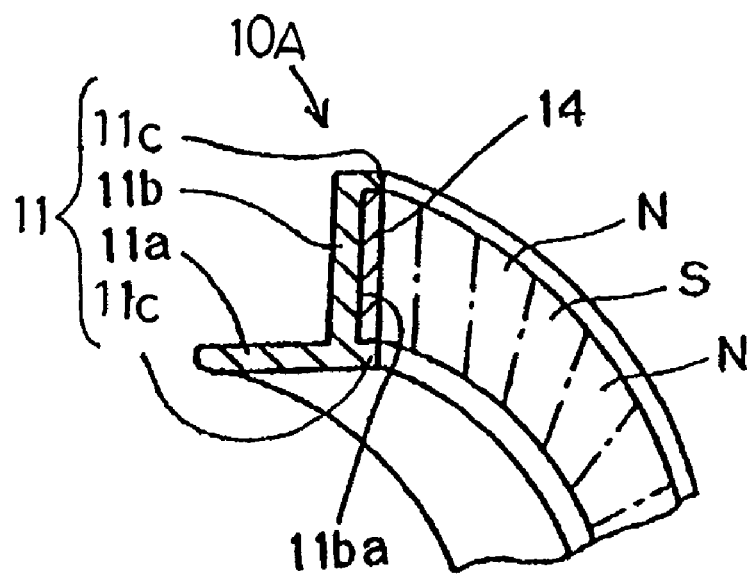
FIG. 22 is a fragmentary perspective view of a magnetic encoder according to a fourth preferred embodiment of the present invention.

Also, the core metal 11 has been described as prepared from a steel plate by the use of any known press work, the core metal 11 may be prepared by machining or cutting a steel material, as represented by a fourth preferred embodiment of the present invention shown in FIG. 22. In this case, the core metal 11 has the wall 11b, in which an annular groove 11ba is formed by machining or cutting in the annular surface of the radial wall 11b for accommodating the sintered element, i.e., the multipolar magnet 14.

Since the magnetic encoder 10A according to the fourth embodiment makes use of the multipolar magnet 14 in the form of the sintered element prepared by sintering a mixture of the magnetic powder and the non-magnetic metallic powder containing at least the copper powder, the multipolar magnet 14 can have an increased elongation (toughness) and is robust to cracking during, for example, transportation or incorporation thereof into the core metal 11 and easy to handle, with the durability improved. More specifically, if a predetermined quantity of the copper powder is mixed when the rare earth magnetic powder is mixed with as a binder the powder of the non-magnetic metal of a low melting point such as tin or zinc, and the resultant mixture is then sintered at a temperature higher than the low melting point of the non-magnetic metallic powder, the tin or zinc powders mixed with the copper powder or the powdery mixture of the tin and the zinc form a solid solution in the copper particles and, therefore, the tin or zinc will not dissolve from the sintered element. Also, since the tin or zinc, which is a metal having a low melting point, forms a solid solution with, or is alloyed with the copper, the binding force of the particles forming the mixed raw material will increase with the elongation (toughness) of the eventually formed sintered element increased considerably.

The multipolar magnet (sintered element) 14 employed in the magnetic encoder 10A of the structure described above was tested to determine the amount of strains observed when the multipolar magnet (sintered element) 14 was broken and, also, the anticorrosive property. Results of the tests will be described with reference to Table 3 together with those of comparisons. It is to be noted that during a series of the tests conducted, 12 samples (for Examples 11 to 22, respectively) of the magnetic encoders 11A were prepared and tested in the manner described below and evaluated as shown in Table 3.

For each of the samples, as the magnetic powder contained in the multipolar magnet 14, the magnetic powder of samarium iron nitrogen (Sm—Fe—N) and the magnetic powder of neodymium iron boron (Nd—Fe—B) were prepared. The binder of a composition containing a copper powder mixed with a powder of tin and the binder of a composition containing a copper powder mixed with a powder of zinc were prepared. Specific compositions, including the magnetic powder and the binder, and quantities thereof in the samples are specified in Table 3. The sintered element (the multipolar magnet 14) in each of those samples was made of a green compact, 4 mm.×20 mm. dia.×1.5 mm by the use of a press and was baked for 1 hour under a predetermined atmosphere.

Each of the samples was subsequently subjected to the three-point bending test, during which the sample was supported at two point spaced 14 mm, to determine the amount of strains at the time of breakage thereof. Also, for each of the samples, the test to determine the amount of strains was repeatedly conducted three times so that the average value of the strain amounts could be obtained, which was rated in three levels in Table 3. Specifically, the average strain amount of not greater than 60 µm was rated X; the average strain amount within the range of 60 to a value not greater than 80 µm was rated O; and the average strain amount of equal to or greater than 80 µm was rated OO, as shown in Table 3. It is to be noted that the speed of the cross-head was 1 mm/min. and the tip of a jig used at the fulcrum had a roundness of 1 mm.

With respect to the test to determine the anticorrosive property, each sample was immersed for 24 hours in a bath containing 5% NaCl solution heated to 55° C. to determine the presence or absence of rusting. Where the rusting was observed in an area that is equal to or larger than 80% of the total surface area was rated X; where the rusting was observed in an area that is within the range of a value equal to or larger than 50% to a value not larger than 80% of the total surface area was rated O; and where the rusting was observed in an area that is not larger than 50% of the total surface area was rated OO in Table 3.

Similar tests and rating were also conducted with respect to the comparisons shown in Table 4 for comparison purpose.

TABLE 3

| Ex. | Composition (wt %) Magnetic Powder Sm—Fe—B | Composition (wt %) Magnetic Powder Nd—Fe—B | Binder (wt %) Cu Powder Cu | Binder (wt %) Cu Powder Type | Binder (wt %) Sn Powder | Binder (wt %) Zn Powder | Baking Atmosphere | Baking Temp. (° C.) | Strain Quantity | Anticorrosive Property |
|---|---|---|---|---|---|---|---|---|---|---|
| 11 | 60 | — | 36 | Electrolytic Powder | 4 | — | Nitrogen | 300 | ○○ | ○○ |
| 12 | 60 | — | 36 | Atomized Powder | 4 | — | Nitrogen | 300 | ○ | ○○ |
| 13 | 60 | — | 36 | Electrolytic Powder | 4 | — | Nitrogen | 350 | ○○ | ○○ |
| 14 | 60 | — | 36 | Atomized Powder | 4 | — | Nitrogen | 350 | ○ | ○○ |
| 15 | 60 | — | 36 | Electrolytic Powder | 4 | — | Atmosphere | 350 | ○○ | ○ |
| 16 | 60 | — | 36 | Atomized Powder | 4 | — | Atmosphere | 350 | ○ | ○ |
| 17 | 60 | — | 4 | Electrolytic Powder | 36 | — | Nitrogen | 350 | ○ | ○○ |
| 18 | 60 | — | 4 | Atomized Powder | 36 | — | Nitrogen | 350 | ○ | ○○ |
| 19 | — | 60 | 36 | Electrolytic Powder | 4 | — | Nitrogen | 350 | ○○ | ○○ |
| 20 | — | 60 | 36 | Atomized Powder | 4 | — | Nitrogen | 350 | ○ | ○○ |
| 21 | 60 | — | 36 | Electrolytic Powder | — | 4 | Nitrogen | 450 | ○○ | ○○ |
| 22 | 60 | — | 36 | Atomized Powder | — | 4 | Nitrogen | 450 | ○ | ○○ |

TABLE 4

| Comp. | Composition (wt %) Magnetic Powder Sm—Fe—B | Composition (wt %) Magnetic Powder Nd—Fe—B | Binder (wt %) Cu Powder Cu | Binder (wt %) Cu Powder Type | Binder (wt %) Sn Powder | Binder (wt %) Zn Powder | Baking Atmosphere | Baking Temp. (° C.) | Strain Quantity | Anticorrosive Property |
|---|---|---|---|---|---|---|---|---|---|---|
| 5 | 60 | — | 39 | Electrolytic Powder | 1 | — | Nitrogen | 350 | —(*) | —(*) |
| 6 | 60 | — | 39 | Atomized Powder | 1 | — | Nitrogen | 350 | —(*) | —(*) |
| 7 | 60 | — | 1 | Electrolytic Powder | 39 | — | Nitrogen | 350 | X | ○ |
| 8 | 60 | — | 1 | Atomized Powder | 39 | — | Nitrogen | 350 | X | ○ |
| 9 | 60 | — | — | — | 40 | — | Atmosphere | 220 | X | X |
| 10 | 60 | — | — | — | — | 40 | Atmosphere | 400 | X | X |

Note:
(*)represents the measurement unable to achieve.

EXAMPLES 11 to 14

The magnetic powder of Sm—Fe—N was used for the sintered element (the multipolar magnet 14). The powdery mixture of the magnetic powder and the non-magnetic metallic powder containing the specified quantities of copper and tin powders as a binder was baked under the nitrogen atmosphere. In these Examples 11 to 14, not only the strain quantity but the anticorrosive property were satisfactory in each Example. In particular, where the copper powder was an electrolytic powder, the strain amount was particularly satisfactory as in Examples 11 and 13.

EXAMPLES 15 and 16

The magnetic powder of Sm—Fe—N was used for the sintered element (the multipolar magnet 14). The powdery mixture of the magnetic powder and the non-magnetic metallic powder containing the specified quantities of copper and tin powders as a binder was baked under the atmosphere. In these Examples 15 and 16, although the anticorrosive property exhibited was somewhat unsatisfactory as compared with that baked under the atmosphere, not only the strain amount but the anticorrosive property were satisfactory in each Example. In particular, where the copper powder was an electrolytic powder, the strain amount was particularly satisfactory in Example 15.

EXAMPLES 17 and 18

The magnetic powder of Sm—Fe—N was used for the sintered element (the multipolar magnet 14). The powdery mixture of the magnetic powder and the non-magnetic metallic powder containing the specified quantities of copper and tin powders as a binder was baked under the nitrogen atmosphere. In these Examples 17 and 18, not only the strain amount but the anticorrosive property were satisfactory. In particular, where the copper powder was an electrolytic powder, the strain amount was particularly satisfactory.

EXAMPLES 19 and 20

The magnetic powder of Nd—Fe—B was used for the sintered element (the multipolar magnet 14). The powdery mixture of the magnetic powder and the non-magnetic metallic powder containing the specified quantities of copper and zinc powders as a binder was baked under the nitrogen atmosphere. In these Examples 19 and 20, not only the strain amount but the anticorrosive property were satisfactory.

EXAMPLES 21 and 22

The magnetic powder of Sm—Fe—N was used for the sintered element (the multipolar magnet 14). The powdery mixture of the magnetic powder and the non-magnetic metallic powder containing the specified quantities of copper and zinc powders as a binder was baked under the nitrogen atmosphere. In these Examples 21 and 22, not only the strain quantity but the anticorrosive property were satisfactory. In particular, where the copper powder was an electrolytic powder, the strain amount was particularly satisfactory in Example 21.

Comparisons 5 and 6:

The magnetic powder of Sm—Fe—N was used for the sintered element (the multipolar magnet 14). The powdery mixture of the magnetic powder and the non-magnetic metallic powder containing the specified quantities of copper and tin powders as a binder was baked under the nitrogen atmosphere. In these Comparisons 5 and 6, since the quantity of the tin powder having a low melting point was small, the resultant sintered element was found very fragile and, hence, the strain amount and the anticorrosive property could not be measured.

Comparisons 7 and 8:

The magnetic powder of Sm—Fe—N was used for the sintered element (the multipolar magnet 14). The powdery mixture of the magnetic powder and the non-magnetic metallic powder containing the specified quantities of copper and tin powders as a binder was baked under the nitrogen atmosphere. In these Comparisons 7 and 8, since the mixing ratio of the copper powder and the tin powder was not balanced, the strain amount was unsatisfactory, but the anticorrosive property was found relatively satisfactory.

Comparisons 9 and 10:

The magnetic powder of Sm—Fe—N was used for the sintered element (the multipolar magnet 14). The powdery mixture of the magnetic powder and the non-magnetic metallic powder containing the specified quantities of only tin powder as a binder was baked under the atmosphere. In these Comparisons 9 and 10, since increase of the toughness affordable by alloying of the copper powder and the tin powder is not expected in these comparisons, the strain amount was unsatisfactory and the anticorrosive property was also found unsatisfactory.

It is to be noted that the magnetic encoder 10A of the structure according to the second embodiment of the present invention is also mounted on the wheel support bearing assembly in the manner which has been shown and described with reference to FIGS. 14 and 15.

Figure 23:
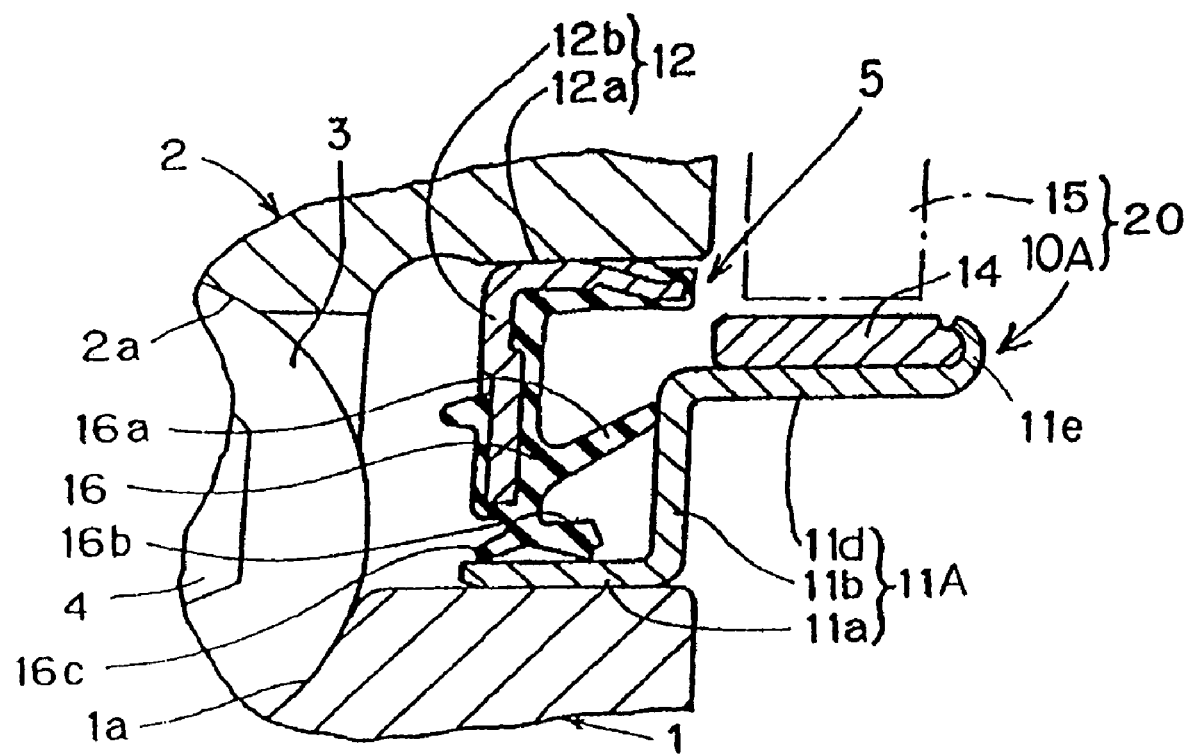
FIG. 23 is a fragmentary longitudinal sectional view showing an important portion of the wheel support bearing assembly, shown together with the magnetic encoder according to the second embodiment of the present invention.

The magnetic encoder 10A may be mounted in the bearing assembly not only with the multipolar magnet 14 oriented axially as shown in FIGS. 14 and 15, but also with the multipolar magnet 14 oriented radially as shown in FIG. 23. In particular, in the modification shown in FIG. 23, the core metal 11A, which is a seal plate serving as a slinger in the sealing unit 5, is additionally formed with a second axial cylindrical wall 11d which extends axially from the outer peripheral portion of the radial wall 11b in a direction counter to the first cylindrical wall 11a, and the multipolar magnet 14 is fixedly mounted on an outer peripheral surface of the second cylindrical wall 11d. This second cylindrical wall 11d has a free end portion which is formed integrally with a radially outwardly extending staked portion 11e, so that by staking this portion 11e the multipolar magnet 14 can be fixed to the outer peripheral surface of the second cylindrical wall 11d. The radial wall 11b extends radially outwardly from the cylindrical wall 11a.

In this modification, the core metal 11A is of one-piece construction representing a generally inverted Z-sectioned annular shape including the cylindrical wall 11a, the radial wall 11b and the second cylindrical wall 11d, with the staked portion 11e so formed integrally with the second cylindrical wall 11d as to extend radially outwardly. The magnetic sensor 15 cooperable with the magnetic encoder 10A is positioned radially outwardly and in alignment with the multipolar magnet 14.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, in describing the various embodiments of the present invention, the magnetic encoder 10 or 10A has been shown and described as a component part of the bearing sealing unit 5. However, the magnetic encoder 10 or 10A can be used in practice by itself, i.e., separate from the sealing unit 5, for detecting the number of revolutions of a rotating element in cooperation with the magnetic sensor. In such case, the magnetic encoder 10A of the second embodiment, for example, can be installed in the bearing assembly independent and separate from the sealing unit 5.

Accordingly, such changes and modifications are, unless they depart from the scope of the present invention as delivered from the claims annexed hereto, to be construed as included therein.

What is claimed is:

1. A method of mounting a magnetic encoder on an outer periphery of an encoder carrier member by press-fitting, wherein the magnetic encoder comprises a multipolar magnet formed of a sintered element and having a plurality of alternating magnetic poles alternating with each other in a direction circumferentially thereof; and a core metal supporting the multipolar magnet, the sintered element being prepared by sintering a powdery mixture of a magnetic powder and a non-magnetic metallic powder; the sintered element being fixed on the core metal by means of a staking technique to provide a sintered element/core metal assembly; and an anticorrosive resinous coating formed over an entire surface of the sintered element/core metal assembly by means of a surface treatment, which method comprises:

when the magnetic encoder is press-fitted on the outer periphery of the encoder carrier member, heating one of a press-fitting punch and the magnetic encoder to a temperature within the range of 60 to 150° C.

* * * * *

UNITED STATES PATENT AND TRADEMARK OFFICE
CERTIFICATE OF CORRECTION

PATENT NO. : 7,237,960 B2  Page 1 of 1
APPLICATION NO. : 10/940776
DATED : July 3, 2007
INVENTOR(S) : Kouya Oohira et al.

It is certified that error appears in the above-identified patent and that said Letters Patent is hereby corrected as shown below:

Title Page, Column 2 item 57 (Abstract), Line 15, change "(1)" to --(11)--.

Signed and Sealed this

Eighth Day of April, 2008

JON W. DUDAS
*Director of the United States Patent and Trademark Office*